(12) United States Patent
Wentz

(10) Patent No.: US 11,240,025 B2
(45) Date of Patent: Feb. 1, 2022

(54) SYSTEMS AND METHODS FOR DISTRIBUTED KEY STORAGE

(71) Applicant: Ares Technologies, Inc., Cambridge, MA (US)

(72) Inventor: Christian Wentz, Providence, RI (US)

(73) Assignee: Ares Technologies, Inc., Boston, MA (US)

( * ) Notice: Subject to any disclaimer, the term of this patent is extended or adjusted under 35 U.S.C. 154(b) by 105 days.

(21) Appl. No.: 16/680,787

(22) Filed: Nov. 12, 2019

(65) Prior Publication Data

US 2020/0153627 A1  May 14, 2020

Related U.S. Application Data

(60) Provisional application No. 62/760,832, filed on Nov. 13, 2018, provisional application No. 62/758,367, filed on Nov. 9, 2018.

(51) Int. Cl.
| | |
|---|---|
| *H04L 9/08* | (2006.01) |
| *H04L 9/32* | (2006.01) |
| *G06F 21/60* | (2013.01) |
| *G06F 21/62* | (2013.01) |

(52) U.S. Cl.
CPC .......... *H04L 9/0894* (2013.01); *G06F 21/602* (2013.01); *G06F 21/6218* (2013.01); *H04L 9/3213* (2013.01); *H04L 9/3218* (2013.01)

(58) Field of Classification Search
CPC ... H04L 9/0894; H04L 9/3213; H04L 9/3218; G06F 21/602; G06F 21/6218
USPC ........................................................ 713/159
See application file for complete search history.

(56) References Cited

U.S. PATENT DOCUMENTS

| | | | |
|---|---|---|---|
| 8,689,000 B2 | 4/2014 | Chen et al. | |
| 8,762,729 B2 | 6/2014 | Hwang et al. | |
| 10,200,369 B1* | 2/2019 | Roundy | ................ H04L 63/10 |
| 2019/0140919 A1 | 5/2019 | Smith et al. | |
| 2019/0149523 A1 | 5/2019 | Shin et al. | |

(Continued)

FOREIGN PATENT DOCUMENTS

WO     2019006446     1/2019

OTHER PUBLICATIONS

Zhang, et al., Privacy-Preserving Multi-Receiver Certificateless Broadcast Encryption Scheme with De-Duplication, Journal, Jul. 13, 2019 https://www.mdpi.com/1424-8220/19/15/3370.

*Primary Examiner* — Kambiz Zand
*Assistant Examiner* — Phuc Pham
(74) *Attorney, Agent, or Firm* — Caldwell Intellectual Property Law, LLC

(57) ABSTRACT

A system for implementing a distributed certificate authority using trusted hardware includes a first verifying node communicatively coupled to a plurality of remote devices, the verifying node designed and configured to receive an authorization request from a remote device, wherein receiving the authorization request further comprises receiving an identifier of the remote device, authenticate the remote device, and generate an authorization token, wherein generating the authorization token further includes associating the identifier of the remote device with at least an authorization datum, associating the identifier of the remote device with at least a temporal attribute, and digitally signing the authorization datum, and generating the authorization token containing the digitally signed authorization datum.

20 Claims, 5 Drawing Sheets

(56) References Cited

U.S. PATENT DOCUMENTS

2019/0182654 A1\* 6/2019 Jerichow ............... H04W 8/183
2019/0312734 A1   10/2019 Wentz et al.
2020/0211022 A1\* 7/2020 Allbright ............... G06Q 20/34
2021/0036856 A1\* 2/2021 Wang ..................... H04L 29/06

\* cited by examiner

SYSTEMS AND METHODS FOR DISTRIBUTED KEY STORAGE

CROSS-REFERENCE TO RELATED APPLICATIONS

This application claims priority to Provisional Application No. 62/760,832 filed on Nov. 13, 2018 and entitled "SYSTEMS, DEVICES, AND METHODS FOR DISTRIBUTED KEY STORAGE" the entirety of which is incorporated herein by reference. This application further claims priority to U.S. Provisional Application 62/758,367, filed on Nov. 9, 2018 and entitled "METHODS AND SYSTEMS FOR A DISTRIBUTED CERTIFICATE AUTHORITY," the entirety of which is incorporated herein by reference.

FIELD OF THE INVENTION

The present invention generally relates to the field of data storage and authentication in distributed computing systems. In particular, the present invention is directed to methods and systems for a distributed certificate authority.

BACKGROUND

Many networks and security rely on certificate authorities to provide a foundation of reliability on which authentication and other security measures depend. This can be problematic in a number of ways; first it requires granting a large degree of power and control to a single entity, which if compromised can undermine an entire system. Second, that single entity constitutes a natural bottleneck in authentication processes, resulting either in slower performance, or in greater risk of spoofing or other compromises due to stale authorizations.

SUMMARY OF THE DISCLOSURE

In an aspect, a method of implementing a distributed certificate authority using trusted hardware, includes receiving, at a first verifying node, an authorization request from a remote device, wherein receiving the authorization request further comprises receiving an identifier of the remote device. The method includes authenticating, by the first verifying node, the remote device. The method includes generating, by the first verifying node, an authorization token, wherein generating the authorization token further includes associating the identifier of the remote device with at least an authorization datum, associating a temporal attribute with the authorization token, and digitally signing the authorization datum.

In another aspect, a system for implementing a distributed certificate authority using trusted hardware includes a first verifying node communicatively coupled to a plurality of remote devices, the verifying node designed and configured to receive an authorization request from a remote device, wherein receiving the authorization request further comprises receiving an identifier of the remote device, authenticate the remote device, and generate an authorization token, wherein generating the authorization token further includes associating the identifier of the remote device with at least an authorization datum, associating the identifier of the remote device with at least a temporal attribute, and digitally signing the authorization datum, and generating the authorization token containing the digitally signed authorization datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
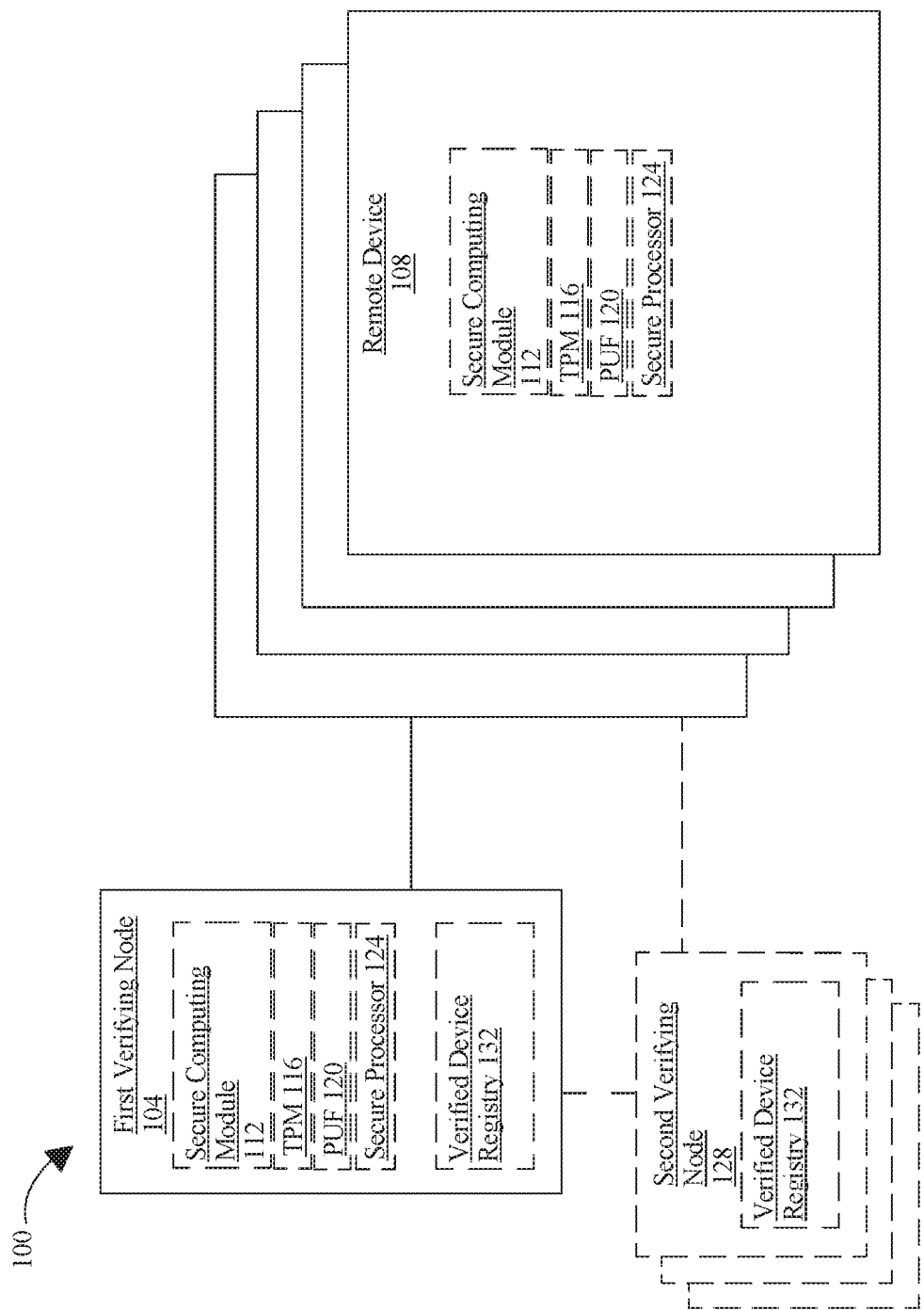
FIG. 1 is a block diagram illustrating an exemplary embodiment of a system for implementing a distributed certificate authority.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to improvements to architecture and processes for storing secure information including authentication information necessary for engagement in digital currency transfers and authentication of digitally signed assertions including cryptographic immutable ledgers, such as block chains. In an embodiment, disclosed systems and methods provide for convenient and secure storage of keys and similar confidential information, by combining aspects of trusted computing and distributed storage. Storage nodes may be authenticated and selected according to trustworthiness, with potential weak points in storage protocols being performed by highly trusted nodes. Rigor in node and user authentication may be varied according to risk levels and user preferences to achieve an ideal balance of convenience and security. In an embodiment, disclosed systems and methods verify remote devices and generate authorization tokens granting and/or denying remote devices network access, from systems utilizing trusted hardware including e.g. secure proof, to heuristics-based systems based on device fingerprints including e.g. location and behavior on a network graph, transactional behaviors, direct or indirect geolocation (e.g. via GPS data or timing analysis to/from neighboring nodes on a network graph, and so forth). As a result, systems presented herein are capable of ensuring that network security is as effective as necessary while permitting devices access to such networks.

Systems and methods as described herein may involve computation, calculation, assessment, assignment, or use of a confidence level associated with one or more processes, devices, or data as described herein. A confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance a flag may indicate that a particular device, program, process, or element of data appears to be compromised and/or has been involved in fraudulent or otherwise hostile or disruptive engagement with system and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Some embodiments of the disclosed systems and methods involve creation and/or evaluation of digital signatures. A digital signature as used herein is a secure proof performed on an element of data, referred to as a "message"; secure proof may include any secure proof as described in this disclosure. Message may include without limitation an encrypted mathematical representation of a file or other set of data. File or set of data may confer credentials, which may demonstrate, without limitation, any result of any authentication or authorization process performed by a signing device. Credentials, which may take the form of authorization tokens, may be generated, conferred, signed, or otherwise manipulated in any suitable way, including without limitation as disclosed in U.S. Provisional Application 62/758,367. Secure proof may be enacted, without limitation, by encrypting message using a private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file. A digital signature may be evaluated in general using a verification datum associated with a secure proof used to generate digital signature. As a further non-limiting example, digital signature may be performed according to any embodiment described in U.S. Provisional Application 62/815,493, filed on Mar. 8, 2019 and entitled "METHODS AND SYSTEMS FOR IMPLEMENTING AN ANONYMIZED ATTESTATION CHAIN," the entirety of which is incorporated by reference herein. As a digital signature may be seen as an implementation of a secure proof upon message, a digital signature may be referred to herein as a form of secure proof, as indicating that the digital signature represents a manner in which a secure proof is being implemented.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

In an embodiment, a certificate authority may include a manufacturer of a device. For instance, manufacturer may verify that a private key, or secret usable to produce a secure proof as set forth in further detail below, available to a device is associated with one or more devices produced by the manufacturer; verification may take the form of a digital signature created by the manufacturer, signing a verification datum and/or public key corresponding to the private key and/or secret belonging to the device. Private key and/or secret may be device-specific or may be issued to a group of devices; in the latter case, a device signing with private key and/or generating a secure proof based on secret may convey that it belongs to that group of devices, without making it possible for a device evaluating the signature and/or secure proof to identify the specific device. A group of devices so identified may have characteristics in common, such as instances and/or versions of hardware, firmware, or other elements, including without limitation secure computing modules as described in further detail below; identification that device is in group may, for instance, indicate that device may be trusted to a certain degree, or be granted a certain confidence level, by virtue of degrees to which its secure computing module may be trusted to perform authentic attested processes or the like. Manufacturer and/or devices participating in embodiments of systems as described herein may receive, assign, or generate confidence levels associated with such group identities, including without limitation assignment of lower or minimal confidence levels for groups with regard to which a vulnerability to hacking or exploits has been identified, a group one member of which has been associated with an illegal, fraudulent, or undesirable act, a group one member of which has been compromised, hacked, or stolen, or the like. In an embodiment, where a group has been compromised, given a lower confidence level, or the like, individual devices in group having device-specific secrets or private keys may sign transactions with such keys, sacrificing a degree of anonymity to differentiate themselves from compromised members of such groups. Group keys and/or secrets may be embedded in hardware of devices during manufacture, as described in further detail below. Group keys and/or secrets may be assigned and/or signed by devices other than manufacturers; group keys and/or assignment of group keys may be used in direct anonymous attestation as described in further detail below. Group keys may enable processes of identification and/or attestation, such as without limitation direct anonymous attestation, to be performed in which a digital signature and/or secure proof confirms that an entity and/or device is part of a group but cannot determine which member of a group it is.

In other embodiments where trust in a single certificate authority is undesirable (e.g., where there is concern of the certificate authority and verifier colluding), the same functionality may be accomplished by a group of certificate authorities acting to authenticate in coordination via any number of means. In a nonlimiting example this may be implemented with the requirement that a threshold number of the group of certificate authorities, and/or a threshold proportion of the group of certificate authorities, agree (e.g. "threshold cryptography"), or alternatively in nonlimiting example via multi-signature such as a BLS signature, group signature, ring signature and the like; a confidence level in each certificate authority may be determined according to any method or means described herein for determination of a confidence level in any device or entity, including without limitation in a distributed storage node as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module 112 as described in further detail below; in such scenarios, authentication may include proof by the secure computing module 112 that the secure computing module 112 possesses a secret key to a public key/certificate pair. Additionally or alternatively, one or more verifying nodes as described in further detail below may act as certificate authorities, including using threshold cryptography; the one or more verifying nodes may create authorization tokens as described below, including without limitation storage node authorization tokens. Certificate authority may include any device and/or devices acting as certificate authorities as disclosed in U.S. Provisional Application 62/758,367. Digital signatures may be performed, without limitation, using any interactive or non-interactive zero-knowledge proof; for instance, a proof may be recorded in conjunction with a datum, and a verification may be performed by any party seeking to evaluate the proof. In an embodiment, a proof recorded with a datum may include and/or be generated using a datum such as a private or public key, a secret, and/or secure proof.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, an exemplary embodiment of a system 100 for distributed key storage is illustrated. System 100 includes a first verifying node 104. First verifying node 104 may be any computing device as described below in reference to FIG. 5. First verifying node 104 may be included in any computing device as described below in reference to FIG. 5. Requesting device may include a single computing device operating independently, or may include two or more computing devices operating in concert, in parallel, sequentially or the like; two or more computing devices may be included together in a single computing device or in two or more computing devices. Requesting device may be an element of, be in communication with, or otherwise utilize a secure computing module as described below in further detail.

Still referring to FIG. 1, first verifying node 104 may be communicatively connected a plurality of remote devices 108; one or more remote devices 108 may include any device or devices suitable for use as first verifying node 104. As used herein, a first device is "communicatively connected" to second device when the first device is able to send data to and/or receive data from the second device using electronic communication. Communicatively connected devices may be capable of communication via direct or indirect wired or wireless communication, including without limitation using any proprietary or standard internet protocol suite, including transfer control protocol/Internet protocol (TCP/IP), UDP, DCCP, SCTP, RSVP, QUIC or the like, may utilize additionally application layer protocols such as hypertext transfer protocol (HTTP), secure HTTP (HTTPS), file transfer protocol (FTP), Transport Layer Security (TLS), mutual TLS (mTLS), SSL, BGP, DHCP, DNS, FTP, IMAP, LDAP, MGCP, MQTT, NNTP, NTP, POP, ONC/RPC, RTP, RTSP, RIP, SIP, SMTP, SNMP, SSH, Telnet, XMPP or the like. Communication of data between first device and second device may be relayed via one or more intermediate devices on a communication network, including without limitation modems, servers, telecommunications devices, and the like. A device may be communicatively connected to a communication network, as used herein, where the device is able to send data to, and/or receive data from, at least one other device connected to the network. A communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. First verifying node 104 may be designed and configured to perform any method step or steps as disclosed herein, in any order or combination, and with any degree of repetition; as a non-limiting example, first verifying node 104 may be designed and configured to receive an authorization request from a remote device, wherein receiving the authorization request further comprises receiving an identifier of the remote device, authenticate the remote device, and generate an authorization token, wherein generating the authorization token further comprises associating the identifier of the remote device with at least an authorization datum, digitally signing the authorization datum, and generating the authorization token containing the digitally signed authorization datum.

With continued reference to FIG. 1, requesting device and/or any remote device of plurality of remote devices may include a secure computing module 112. As used herein, a secure computing module 112 is a hardware or software element configured to perform one or more secured operations beyond the control of other circuit elements or software, whether incorporated with the secure computing module 112 in a circuit or computing device, or a part of an extrinsic computing device. As a result, at least one secured operation performed by secure computing module 112 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 112 and/or a system or computing device incorporating secure computing module 112 based on the above-described set of assumptions. As a non-limiting, example, a secure computing module 112 designed to produce an expected result despite all software-only attacks may give rise to a first confidence level, whereas another secure computing module 112 designed to produce its expected result in the face of all software or hardware attacks may give rise to a second confidence level; the second confidence level may be higher, owing to the reduced probability that the second secure computing module 112 would be compromised.

Still viewing FIG. 1, secure computing module 112 may include a trusted platform module (TPM 116). In an embodiment, a TPM 116 may include a hardware module, which may be an integrated circuit, an optoelectronic circuit, a section of an integrated circuit on the same die as a requesting device, an integrated circuit packaged with other die in a multi-chip module or other multi-die integration method, or printed circuit board product; TPM 116 may have any suitable elements of digital or analog circuitry usable to perform one or more processes as described herein, including without limitation processes used to determine confidence levels and/or authenticate digitally signed assertions as described below. TPM 116 may have memory and/or other logic and/or a requesting device in its own right which may be in a non-limiting example a crypto-requesting device and/or cryptoprocessor. TPM 116 may have a hard-coded process for signing a digital signature, which may be performed using a private key, which is associated with a public key. TPM 116 may be configured to incorporate a secure enclave and protocols for performing attestation on behalf of an untrusted or less trusted hardware or software element, e.g. TPM 116 may be configured to have attestation requests from such a less trusted element relayed to it for secure signing, and may include packaging of signed data for use in an attestation protocol, representative embodiments of which are included in this disclosure. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices. Where an element being "signed by PUF" and/or "generated by a PUF," as used herein, may include any PUF-backed and/or derived key generation or the like as described herein.

With continued reference to FIG. 1, secure computing module 112 may include at least PUF 120. PUF 120 may be implemented by various means. In an embodiment, PUF 120 includes one or more non-intrinsic PUFs. Non-intrinsic PUFs may include without limitation optics-based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. Near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics-based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 120 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay-based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 120 may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 120 in an embodiment include without limitation buskeeper PUFs, which may be similar to other PUFs based on bistable memory elements but leveraging buskeeper cells. PUF 120 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, PUF 120 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1 PUF 120 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode-based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique Ds based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF 120 may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF 120 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe microcavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF 120 that may be used may include, without limitation, nano-electromechanical (NEM) PUFs. NEM PUFs may include PUFs that leverage stiction of a silicon nanowire to a binary gate structure. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 120 and/or TPM 116; such outputs may be used to generate symmetric or asymmetric keys, private keys, zero-knowledge proofs, secure proofs, digital signatures or other proofs of authenticity, as described in further detail below.

Continuing to refer to FIG. 1, secure computing module 112 may implement one or more secure memory storage protocols. One or more secure memory storage protocols may be protocols designed to prevent unauthorized access to memory and/or to protect secure computing module 112 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 112. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 112 may incorporate a memory controller located within the trusted computing boundary to encrypt and authenticate by secret key memory elements such as without limitation memory page tables and/or memory pages accessible by other software elements, such as an operating system. Various techniques, processes, means or elements may be used to implement the above-described secure memory protocols. For instance, secure computing module 112 may use hardware-enabled access control to protect memory access; hardware access control may, as a non-limiting example, be performed by tagging each memory entry with a "container identifier" corresponding to a page, file, or other grouping of memory, enabling secure computing module 112 to determine whether tampering has occurred.

Secure computing module 112 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 112 may operate using one or more dedicated memory objects, registers, or storage elements; as a non-limiting example, secure computing module 112 may operate with dedicated cache lines not available to other processes or circuits, preventing, e.g., stack or buffer overrun attacks to corrupt or steal data. Dedicated memory elements may be wired only to secure computing module 112; access to dedicated memory elements may be rendered impossible except by way of secure computing module 112. Secure computing module 112 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 112 may utilize oblivious random access memory (RAM) wherein memory access patterns are obfuscate to prevent detection of memory access patterns by outside observers attempting to deduce execution details regarding processes performed using secure computing module 112 Secure computing module 112 and/or device incorporating secure computing module 112 may incorporate a trusted non-volatile storage device that provides some means of verification of secure storage capability and other properties. Memory protocols as described above may be used to implement methods of attested storage and the chain of trust beginning at PUF 120 level up through requesting device, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 112.

Still referring to FIG. 1, secure computing module 112 may include a secure processor. Secure processor may be a processor as described below in reference to FIG. 5. Secure processor may operate autonomously from other requesting devices and/or an operating system operating on at least a remote device; for instance, secure processor may store entries in temporary or long-term memory in encrypted form, where decryption is impossible without private keys not available to devices, circuits or software besides secure processor. Encryption may likewise be impossible without private keys available only to secure processor. Secure processor may also digitally sign memory entries using, for instance, a private key available only to secure processor. Keys available only to secure processor may include keys directly encoded in hardware of the secure processor; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor may be constructed, similarly to TPM 116, to frustrate alteration and/or probing to discover and/or alter private keys. Private keys may be demonstrable as uniquely associated with secure processor by use of PUF 120 as described above; secure processor may include, for instance, a TPM 116 as described above. Alternatively or additionally, a certificate authority as described above, which may be a manufacturer of secure processor, may verify that one or more public keys are associated uniquely with secure processor according to any protocol suitable for digital certificates.

With continued reference to FIG. 1, secure computing module 112 may implement one or more methods of attested computation. Attested computation may include or involve one or more methods to ensure that computation of a program, known as an attested program, is trusted and signed by secure computing module 112 and/or computing device incorporating secure computing module 112; this may be supported by means to assert the state of the system memory, code, and input data. In an embodiment, secure computing module 112 and/or a computing device incorporating secure computing module 112 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 112 and/or computing device incorporating secure computing module 112 may append a cryptographic signature based upon any private key that may be associated with secure computing module 112 as described herein. Secure computing module 112 and/or computing device incorporating secure computing module 112 may operate a security reset of working memory prior to load of data for trusted computation; for instance, the secure computing module 112 and/or computing device incorporating secure computing module 112 may append a hash of the memory to cryptographic hash of system state following reset and prior to loading data. Secure computing module 112 and/or computing device incorporating secure computing module 112 may append its authentication signature of memory page tables and/or memory tables. Upon completion of the trusted computation, which may include execution of program code of system state, secure computing module 112 and/or computing device incorporating secure computing module 112 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 112. Secure computing module 112 and/or computing device incorporating secure computing module 112 may include a system to compute one or more hash trees of cryptographic hash of the computation, system state, and/or outputs; secure computing module 112 and/or computing device incorporating secure computing module 112 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still referring to FIG. 1, examples of secure computing module 112s may include, without limitation, a TPM 116 as described above. Secure computing module 112 may include a TPM 116 combined with a boot-measuring protocol using hash trees, Merkle trees, or the like to measure boot entries to create an "attested boot." Secure computing module 112 may include a trusted execution technology (TXT) module combining TPM 116 with establishment of a secure container at run-time; secure container may be isolated from a software stack and OS of at least a temporal attester 104 and/or use TPM 116 to measure and attest to secure container prior to launch. Secure computing module 112 may include execute-only memory (XOM). Secure computing module 112 may include an Aegis processor. Secure computing module 112 may include a Bastion processor. Secure computing module 112 may include a trusted execution environment (TEE) or enclave, such as that enabled by SOFTWARE GUARD EXTENSIONS (SGX) system as promulgated by Intel Corporation of Santa Clara, Calif. Secure computing module 112 may include a Sanctum processor based on RISC V architecture. Secure computing module 112 may include an Ascend secure infrastructure. Secure computing module 112 may include a Ghostrider secure infrastructure. Secure computing module 112 may include an ARM TrustZone. Secure computing module 112 may include a Trusted Little Kernel (TLK) as promulgated by Nvidia Corporation of Santa Clara, Calif. Secure computing module 112 may include Secure Encrypted Virtualization (SEV) as promulgated by Advanced Micro Devices, Inc. of Santa Clara, Calif. Secure computing module 112 may include silicon root of trust such as OpenTitan as promulgated by the LowRISC Foundation of Cambridge, UK. Secure computing module 112 may include a Titan chip as promulgated by Google of Mountain View, Calif., USA. Secure computing module 112 may include an Azure Sphere MCU and/or Microsoft Pluton as promulgated by Microsoft of Redmond, Wash., USA. Secure computing module 112 may include an iLO subsystem as promulgated by Hewlett Packard Enterprise of San Jose, Calif. Persons skilled in the art, upon reviewing the entirety of this disclosure, will be aware of various additional or alternative trusted computing processes that may be used to implement secure computing module 112 as disclosed herein. System 100 may incorporate or communicate with a certificate authority.

Still referring to FIG. 1, secure computing module 112 may include a secure processor 124. Secure processor 124 may be a processor as described below in reference to FIG. 5. Secure processor 124 may operate autonomously from other processors and/or an operating system operating on at least a remote device; for instance, secure processor may store entries in temporary or long-term memory in encrypted form, where decryption is impossible without private keys not available to devices, circuits or software besides secure processor. Encryption may likewise be impossible without private keys available only to secure processor 124. Secure processor 124 may also digitally sign memory entries using, for instance, a private key available only to secure processor 124. Keys available only to secure processor 124 may include keys directly encoded in hardware of the secure processor 124; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor 124. Secure processor 124 may be constructed, similarly to TPM 116, to frustrate alteration and/or probing to discover and/or alter private keys. Private keys may be demonstrable as uniquely associated with secure processor 124 by use of PUF 120 as described above; secure processor 124 may include, for instance, a TPM 116 as described above. Alternatively or additionally, a certificate authority as described above, which may be a manufacturer of secure processor, may verify that one or more public keys are associated uniquely with secure processor according to any protocol suitable for digital certificates.

Still referring to FIG. 1, first verifying node 104 may be configured to perform any method and/or method steps as disclosed herein, in any order and with any degree of repetition including without limitation performance of secure proofs, storage tasks, authentication tasks, or the like.

With continued reference to FIG. 1, any remote device 108 of plurality of remote devices 108 may be configured to perform any method and/or method steps as disclosed herein, in any order and with any degree of repetition including without limitation performance of secure proofs, storage tasks, authentication tasks, or the like. As a non-limiting example, remote devices 108 may be configured to store at least a confidential datum and a retrieval verification datum, obtain a retrieval token from a first verifying node 104, authenticate first verifying node 104 as a function of the retrieval token, and generate an output as a function of the confidential datum. In an embodiment, any remote device 108 can act as a first verifying node 104; likewise, any device that acts as first verifying node 104 may also be able to act as a remote device 108.

In an embodiment, and still referring to FIG. 1, one or more remote devices 108 may include trusted hardware. Trusted hardware may include any of the hardware as described above in regard to first verifying node 104 and may include secure computing module 112, TPM 116, PUF 120, and/or secure processor 124.

With continued reference to FIG. 1, one or more remote devices 108 may include at least a second verifying node 128. At least a second verifying node 128 may include one or more remote devices authorized to participate in implementation of distributed certificate authority, for instance by performing authorization and authentication steps described herein as performed by first verifying node 104. At least a second verifying node 128 may be a device having an associated confidence level above a given threshold; threshold may be extremely high, placing at least a second verifying node 128 in a "highly trusted" category within system 100. At least a second verifying node 128 may be associated with an entity having special status with regard to system 100, such as without limitation an entity possessing or offering a platform with regard to which confidence levels, heuristics, and/or access levels are being used as described herein. For instance, at least a second verifying node 128 may be a device operated by a company or the like having an institutional identifier in the system. At least a second verifying node 128 may be identified using a secure computing module 112 incorporated in at least a second verifying node 128. An identifier of a remote device 108 authorized to perform a given action system 100, including without limitation an identifier of at least a second verifying node 128, may be recorded in a verified device registry 132; methods to determine whether a device of one or more remote devices 108 is authorized to perform one or more actions in system 100, including whether such a device may function as a second verifying node are described in further detail below. Verified device registry 132 may include any data structure listing verified devices, including a temporally sequential listing as described in further detail below, a peer to peer lookup, a hash table, distributed hash table or other relational database, such that it is possible to query verified device registry 132 with at least a datum, e.g. a cryptographic signature, passphrase, or other piece of information that is uniquely associated to a particular device, or to a particular device at a particular time interval, location in space, authorization, or membership to a group, and to receive a determination upon querying verified device registry 132 as to whether the at least a datum indicates that the associated particular device is a verified device. Such a query to verified device registry 132 may require additional parameters to obtain a correct response, those parameters may include at least a symmetric key, asymmetric key or other secret. Additional parameters may be time-varying, location varying, or varying by group membership of the querying party.

Figure 2:
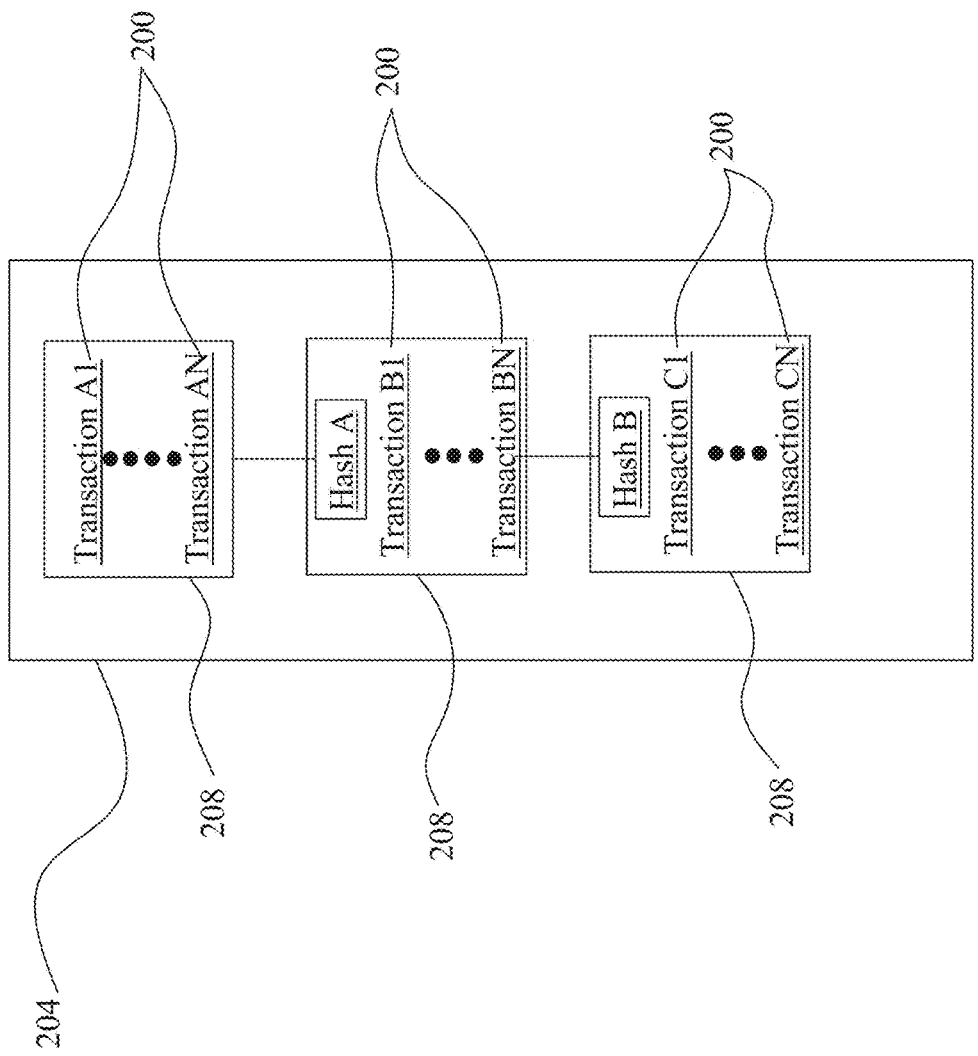
FIG. 2 is a block diagram of an exemplary embodiment of a temporally sequential listing.

Referring now to FIG. 2, system 100 may be used to perform one or more processing steps necessary to create, maintain, and/or authenticate at least a digitally signed assertion 200. In one embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of control, tenancy, or permission to utilize a hardware or software resource, in non-limiting examples access to a virtual machine, software container e.g. a Docker container as promulgated by Docker, Inc. of San Francisco, Calif., or a Kubernetes container as promulgated by the Cloud Native Computing Foundation, software application, function, in nonlimiting example a "function as a service", a software microservice, and the like. A resource may be a physical machine e.g. a ride share vehicle or any other asset. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a remote device as described in further detail below.

With continued reference to FIG. 2, at least a digitally signed assertion 200 may be included in a temporally sequential listing 204. Temporally sequential listing 204 may include any set of data used to record a series of at least a digitally signed assertion 200 in an inalterable format that permits authentication of such at least a digitally signed assertion 200. Textual data associated with a digitally signed assertion 200 may include data attributing a cost function to a user. For example, either as part of the datum itself or by nature of the temporally sequential listing 204 in which it is stored, system 100 may enable the metering of cost for use of a resource to at least a user. In non-limiting example, a cost per unit time, service level, energy, effort, or other consumption may be associated with a property of the at least a digitally signed assertion 200. At least a requesting device may be configured with permissions to query the at least a digitally signed assertion 200 and/or temporally sequential listing 200 and determine the costs owed by a particular user or users. In an embodiment, the ledger balance of a resource, e.g. a virtual currency in nonlimiting example a cryptocurrency, may be updated accordingly as part of the temporally sequential listing. In some embodiments, temporally sequential listing 204 records a series of at least a digitally signed assertion 200 in a way that preserves the order in which the at least a digitally signed assertion 200 took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, digitally signed assertion 200 and/or temporally sequential listing 204 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given digitally signed assertion 200.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a blockchain, which may be themselves collected in a temporally sequential order; digitally signed assertions 200 within a sub-listing 208 may or may not be temporally sequential. In an embodiment, the temporally sequential listing may be a directed acyclic graph (DAG), in which multiple branches may be generated on or by different devices implementing temporally sequential listing 204, and branches may be merged into one another, while a hash chain or similar structure ensures that branches cannot go "back in time" whether merged or not; secure timestamps and/or attested time may be further included to impose a temporal order on a DAG or other temporally sequential listing 204. The ledger may preserve the order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger, but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be crypto currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a remote device, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the remote device) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto currency may be a clone of another crypto currency. The crypto-currency may be an "alt-coin." Crypto currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described below in reference to FIG. 5. For example, and without limitation, at least a digitally signed assertion 200 may include one or more encrypted or otherwise secured or partitioned memory entries as entered for instance using a secure computing module 112 or according to a secure computing protocol as described in further detail below.

Referring again to FIG. 1, in some embodiments, secure computing module 112 and/or remote device may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator, MEMS oscillator, or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, precision time may be verified by random selection, via a random oracle as described below, of nearby neighboring device and/or devices to authenticate the trusted time stamp. Similarly, authentication of GPS coordinates, geolocation information and/or any other sensor information may be authenticated via co-authentication, concurrent or sequential authentication within a given period or time, for instance using any steps or analogous methods described for assignment of and performance of authentication steps by one or more devices in system 100 below. In non-limiting example, authentication of geospatial location may incorporate the random selection of one or more neighboring devices to attest their geospatial location, time of geospatial location sensing, and/or other parameters conferring confirmatory or denial at least a datum. In some embodiments, changes in inferred physical distance or latency between nodes in the graph may be used to flag potentially compromised secure computing modules 116, man in the middle or other attacks.

Still referring to FIG. 1, one or more storage nodes of plurality of remote devices 108 may include a distributed storage instance 128. A distributed storage instance, as used herein, may include any locally stored portion or copy of a data structure used in distributed storage. Distributed storage instance 128 may include a copy of a temporally sequential listing 204, one or more sublistings 208, and/or a reference to a temporally sequential listing 204 or sublisting 208; distributed storage instance 128 may include a sufficient link to or portion of temporally sequential listing 204 to permit a remote device 108 including distributed storage interface 128 to participate in one or more protocols for generating or recording digitally signed assertions 200, creating sublistings 208, and/or authenticating digitally signed assertions 200, sublistings 208, and or temporally sequential listing 204 as describe above. Distributed storage instance 132 may include a local portion or link to any suitable distributed storage data structure, including without limitation a distributed hash table or the like.

With continued reference to FIG. 1, system 100 may include one or more verifying nodes 132. A verifying node of one or more verifying nodes 132 may be a computing device that generates authorization tokens, such as storage node authorization tokens. Verifying node may generate an authorization token solely or in combination with one or more other verifying nodes; for instance, a plurality of verifying nodes 132 may combine to generate an authorization token using threshold cryptography, multisignature, consensus based mechanism, any combination thereof, or other method as may be apparent to one of ordinary skill in the art upon reviewing the entirety of this disclosure. A verifying node may be any device suitable for use as a first verifying node 104 and/or remote device 108. One or more verifying nodes may include one or more computing devices having a very high associated confidence level as defined above; one or more verifying nodes may, for instance, include a secure computing module 112, which may contain elements performing extremely reliable device identification and authentication methods. Secure computing module 112 of a verifying node may produce secure proofs that are authenticated or vouched for by manufacturers, rendering provenance and possession of verifying node more transparent to users and devices in system 100. Secure module may identify verifying node as belonging to an institution, person, or entity having a high degree of trustworthiness regarding system 100; high degree of trustworthiness may be established by identification of entity as one subject to regulation, such as a bank, or one having a significant stake in proper functioning of system 100, such as a large amount of virtual currency within system whose value and usability depend on overall system integrity. Selection of verifying node may be performed by one or more remote devices 108 according to any methods described below for establishment of confidence levels in a node. A verifying node may also be a remote device 108. Verifying node may be recorded or otherwise identified in a verified device registry 132, as described in further detail below.

Any device in system 100, including any device of first verifying node 104, plurality of remote devices 108 and/or one or more verifying nodes, may include an instance of verified device registry 132. Verified device registry 132 may be a distributed data structure containing data entries usable to store, verify, or authenticate retrieval tokens, verifying nodes, authorization tokens, device identities, device group identities, confidence levels in devices, groups of devices, transactions, and/or other elements of system 100. Verified device registry 132 may include any suitable listing of records identifying devices; verified device registry 132 may include a temporally sequential listing 204 as described above. Verified device registry 132 may include a list of authorization tokens as described below in more detail. Verified device registry 132 may include a list of other device identifies, identifiers, and/or authentication determinations concerning them. Verified device registry 132 may include verification data usable to verify secure proofs used in any embodiment of system 100 or methods as described herein. Distribute authentication listing 140 may include secure timestamps or other temporal information, including information of or usable to verify or authenticate a time-limited authentication lease as set forth in further detail herein. An instance of verifying node verified device registry 132 may include a sufficient link to or portion of a temporally sequential listing 204 to permit a remote device 108 including the instance to participate in one or more protocols for generating or recording digitally signed assertions 200, creating sub-listings 208, and/or authenticating digitally signed assertions 200, sublistings 208, and or temporally sequential listing 204 as describe above. Verified device registry 132 may change frequently as devices may be authenticated or verified, and/or as nodes are authentication or verified, and as such may be updated frequently to reflect such activity; a device or group of devices updating verified device registry 132 may update a local instance of the verified device registry 132 and then provide the update and/or local instance to other devices in system 100. Updating of verified device registry 132 between devices in system 100 may occur via peer to peer distributed hash table algorithm such as Chord, CAN, Tapestry, Pastry or any other distributed hash table protocol. Updating may additionally or alternatively utilize any means to distribute a state machine or data structure across a cluster of computing systems, e.g. in non-limiting example Raft consensus algorithm, Paxos protocol in any form including multi-Paxos, Cheap Paxos, Fast Paxos and the like. System 100 may be coordinated using a leader election process as described below. One or more verifying nodes may revoke one or more authorization privileges granted to first verifying node 104 and/or plurality of remote devices 108. Revocation of privileges may be updated and maintained on a revocation list. A revocation list may be a part of verified device registry 132, or it may be its own separate listing. In an embodiment, revocation list may include a sufficient link to or portion of a temporally sequential listing 204. Revocation list may be frequently updated to reflect chances in authentication status. Revocation may include a temporal attribute, and devices and/or nodes may move on and off revocation list such as after a quantifiable period of time has elapsed Persons skilled in the art, upon reviewing the entirety of this disclosure, will be aware of various suitable protocols for disseminating changes to distributed data structures among devices storing or interacting with instances thereof.

Figure 3:
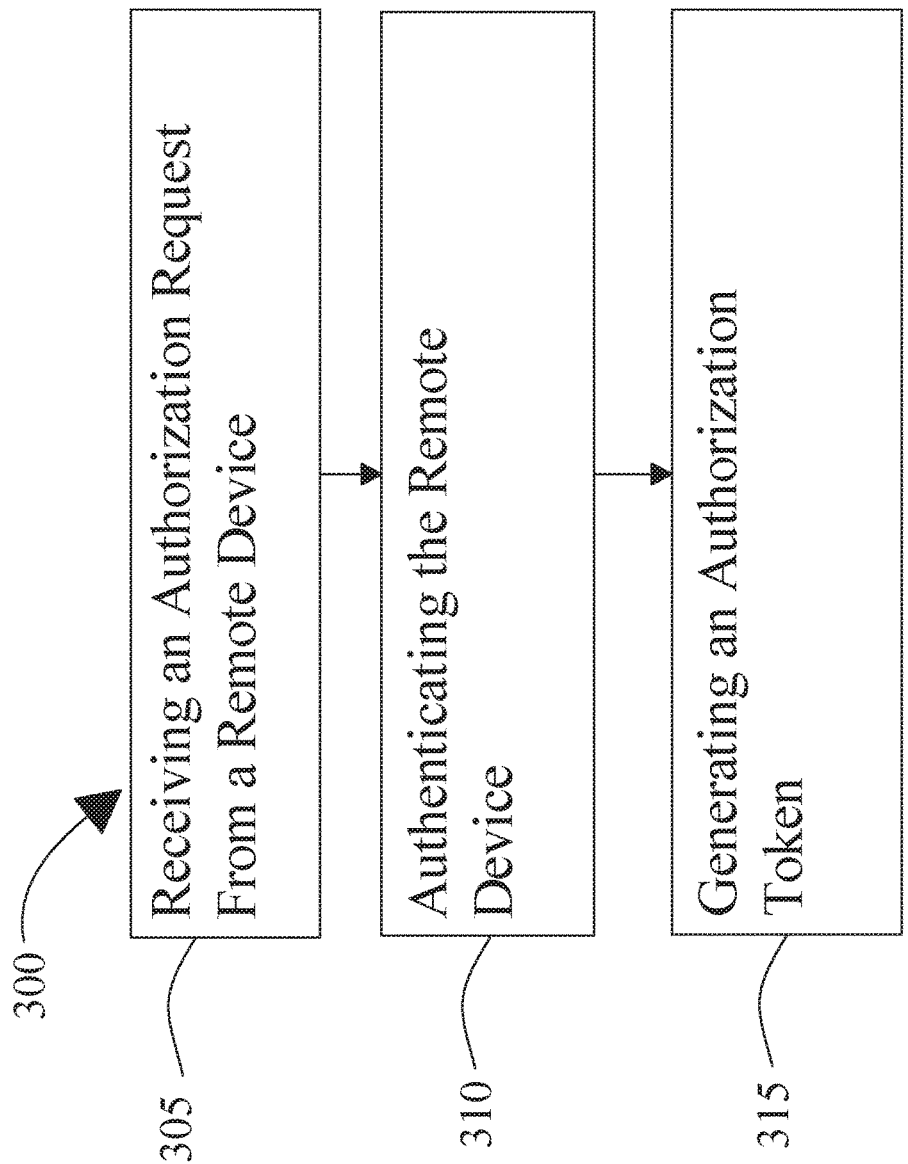
FIG. 3 is a flow diagram illustrating an exemplary embodiment of a method for implementing a distributed certificate authority.

Referring now to FIG. 3, an exemplary embodiment of a method 300 for verifying a remote device joining a network using trusted hardware is illustrated. At step 305, a verifying node receives an authorization request from a remote device 108. As used herein, an authorization request is a request to be granted one or more rights to perform actions within system 100. For instance, and without limitation, an authorization request may include a request for a digital certificate as described above; digital certificate may, for instance and without limitation, associate an identity of a user or entity operating remote device 108 with an identifier of remote device, confer upon remote device access rights on or behalf of or to one or more resources incorporated in or connected to system 100, associate remote device 108 with a given confidence level, grant a transfer of assets, data, and/or access rights from one device to another, or the like. An authorization request may be a request for a right to access one or more resources incorporated in or connected to system 100. An authorization request may include a request to associate an identity of a user or entity operating remote device 108 with an identifier of remote device. An authorization request may include a request to confer upon remote device access rights to one or more resources incorporated in or connected to system 100. An authorization request may include a request to associate remote device 108 with a given confidence level. An authorization request may include a request to grant a transfer of assets, data, and/or access rights from one device to another, or the like. In an embodiment, an authorization request may include a request to be classified as a verifying node, such as without limitation at least a second verifying node 128, authorized to perform actions described herein as performed by first verifying node 104, which may be performed in combination with other verifying nodes as described in further detail below. An authorization request may, as a non-limiting example, be received via any form of wired or wireless electronic communication. Receiving at least an authorization request from remote device 108, may include receiving at least an authorization request directly or indirectly; for instance, remote device 108 may relay the at least an authorization request via other verified nodes connected to the network, or record it in a file, temporally sequential listing, or other register. Indirectly or directly received communications from remote device may include one or more secure proofs, verification data, and/or device fingerprint information usable to identify remote device, as described in further detail below.

With continued reference to FIG. 3, receiving by the at least a verifying node an authorization request may include generating a random oracle output assigning the authorization request to the at least a verifying node. Random oracle output may include an output that responds to every unique query with a truly random or pseudorandom response chosen uniformly or preferentially from its output domain; in an embodiment, a pseudorandom output is one that is infeasible to predict prior to performing steps of random oracle, such as without limitation an output including an output of a cryptographic hash function performed on each unique query. If a query is repeated the output may respond the same way every time that query is submitted. In an embodiment, a random oracle output may include a mathematical function chosen uniformly at random, so that each possible query has an output of a fixed random response. A random oracle may include a verifiable delay function, e.g. a function based on exponentiation in a group of unknown order, a verifiable random function as demonstrated by DFINITY of Zug, Switzerland, a random beacon, such as without limitation a high entropy source such as true random number generator (TRNG) that is signed and timestamped by a device with trusted properties such as a secure computing module 112, two or more devices operating under the principle of proof of elapsed time as demonstrated by Hyperledger sawtooth from IBM, or other random leader election mechanism. In an embodiment, an authorization request applied to a random oracle output may be randomly assigned, by virtue of the random oracle output, to at least a first verifying node 104. In an embodiment, generating a random oracle output assigning the authorization request to the at least a first verifying node 104 may include generating a cryptographic hash from the authorization request. In an embodiment, a cryptographic hash may include a series of values in the set [0, 1]. In an embodiment, the cryptographic hash generated from the authorization request may include a parameter of the authorization request. In an embodiment, the cryptographic hash generated by the at least a verifying node may include an identification string generated by a PUF from the at least a verifying device. The identification string may be digitally signed by PUF and/or any secure proof generated by the at least a verifying node, where an element being "signed by PUF" and/or "generated by a PUF," as used herein, may include any PUF-backed and/or derived key generation or the like as described herein. In an embodiment, the cryptographic hash may be available to the public, meaning other devices and/or verifying nodes on the network, so that the hash may indicate that a random oracle was used to randomly assign first verifying node 104 to remote device 108.

With continued reference to FIG. 3, receiving an authorization request may include receiving a device specific bit-mask, generating a cryptographic hash from an authorization request, and comparing the cryptographic hash to the device specific bit-mask. Receiving a bit-mask may include receiving a string of bits to values in the set [0, 1], that can be used to implement a set data structure; bit-mask may be generated by first verification node 104, for example and without limitation using a random or pseudorandom number generator. Each verification node may generate a device-specific bit-mask associated with that verification node. In an embodiment, a device specific bit-mask may include an identification string generated by a PUF from the remote device. The identification string may be digitally signed by PUF and/or any secure proof generated by the remote device. Generating a cryptographic hash from an authorization request may be done by any of the methods described above. Comparing the cryptographic hash to the device specific bit-mask may result in determining if the at least a first verifying node 104 is selected to authenticate remote device 108. In an embodiment, comparing the cryptographic hash and the bit-mask may be done by Bitwise Boolean Operation. Both the bit-mask and the cryptographic hash may be available to the public, in some instances as cryptographic public keys, so that other devices and/or nodes may be able to evaluate how verifying device 104 selected remote device 108 to verify thereby ensuring first verifying node 104 followed the random oracle. In an embodiment, random oracle may be performed by a plurality of verifying nodes, to select a set of two or more such verifying nodes to perform authorization processes as described herein; for instance, random oracle, or other selection processes, may be configured to result in selection of at least N of K verifying nodes, where N verifying nodes are required to perform a sufficiently rigorous distributed authorization process. Implementation of the distributed authorization, e.g. requiring N or more verifying nodes to perform authorization, and coordinating among the N or more verifying nodes to yield a verification, may utilize random oracles as described above, and/or utilize threshold signatures; as a non-limiting example, threshold-optimal DSA/ECDSA signatures, short signatures from the Weil pairing, optimal Ate Pairing over Barreto-Naehrig curves, Noneh-Lynn-Shacham signatures, Full-Domain-Hash or other RSA-based signatures may be used. It will be apparent to those skilled in the art, upon reviewing the entirety of this disclosure, how the foregoing may be further optimized by utilizing properties of secure enclaves, trusted execution environments, or the like in at least a trusted computing module 112 to ensure setup of the signature scheme and/or correct execution of constituent elements. In an embodiment, authorization by N or more verifiers may be implemented in parallel, with at least a verifier node selected by any number of means acting as the coordinator between the remote device 108 and the N or more verifying nodes. By setting the number of verifying nodes in a network to N of K, on average, an expected number of verifying nodes 104 may be present in a network. As networks grow and get bigger or get smaller and/or is broken sub-networks to be governed by subsets of an overall community of verified devices, any of those changes may be accounted for regarding how many (K) given verifying nodes will be available to perform authorization processes, and a selection process, including without limitation a random oracle, may be configured so that as the average expected number of verifying nodes will be N of K. This may be performed by each verifying node including a select number of bits in its device-specific bit-mask so that the number of matching hashes will be at least N of K. The number N of required verifying nodes may be set, as a non-limiting example, according to a degree of importance of the authorization to be performed; for instance, classifying remote device 108 as a verifying node may require a higher N than granting remote device 108 a certificate identifying remote device 108 to other devices in system 100, because the former may have greater consequences for the security of the system 100. Determination of the required N of K verifying nodes may further incorporate network security parameters, such as in non-limiting examples an expected adversarial strength and/or acceptable failure probability. In one embodiment, the random selection of one or more verifiers as described above occurs at every authorization request. In an alternative embodiment, the random selection occurs at regular or varying time intervals, such that the cost of random selection is amortized over the handling of multiple authorization requests.

In an embodiment, selection of one or more verifying nodes via random oracle processes or the like as described above may be combined with other processes for selection of an optimal or otherwise desirable population of verifying nodes. Such selection, which may be performed either prior to or subsequent to random oracle or similar processes as described above, may include selection of verifier nodes according to a measure of proximity to remote device 108 and/or one another, where measure of proximity may include without limitation proximity within a network, minimized communication latency, geographical proximity, or the like. As a further example, where some group keys such as manufacturer group keys as described above are possessed and/or verifiable by some but not all verifying nodes, one or more verifying devices may be selected to perform steps of method 300 because the one or more verifying devices are able to verify a group key available to or utilized by remote device 108; such verifying devices may be located by other verifying devices and/or within system 100 by use of data structures such as distributed hash tables usable for mapping values to devices; for instance, and without limitation, verifying nodes and/or other elements of system may locate such verifying nodes to participate in method 300 via peer to peer routing mechanisms such as Chord, Kademlia and the like. Alternatively, each verifying node may possess copies of all public keys to be verified and/or may be capable of verification of any group key and/or device-specific signature and/or secure proof.

Still viewing FIG. 3, receiving an authorization request includes receiving an identifier of remote device 108. Receiving the identifier may include receiving a secure proof from remote device 108. A secure proof, as used herein, is a protocol whereby an output is generated that demonstrates possession of a secret, such as a secret stored in or produced by secure computing module 112 and/or PUF 120, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange. Identifier may be specific to remote device 108; alternatively or additionally, identifier may include a group identifier and/or signature or secure proof generated by a group key and/or secret as described above, identifying remote device 108 through an anonymizing process such as without limitation DAA. With continued reference to FIG. 3. secure proof may include a digital signature. In an embodiment, digital signature may be any digital signature as described above; digital signature may be created by signing a mathematical representation of first dataset. In an embodiment, remote device 108 may generate a key to be used in producing digital signature using secure computing module 112. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, remote device 108 and/or secure computing module 112 may convert immediate output from PUF 120 into key in the form of a binary number. In non-limiting example, PUF 120 may utilize at least a TRNG or other entropy source to provision an N bit secret vector that is hashed via a cryptographic one-way function, in non-limiting example SHA256, SHA3 or the like, to create a seed for a key derivation function (KDF), in non-limiting example ED25519, generating at least a public/private key pair. At least a PUF 120 may, in a non-limiting example, output an M bit vector $\vec{e}$ (or a subset of PUF 120 output is truncated, multiple PUF outputs may be concatenated, or any combination thereof) which, combined with a public M×N bit matrix A and potentially public helper vector $\vec{b}$ satisfies the equation $\vec{b} = A\vec{s} + \vec{e}$. such that PUF output $\vec{e}$ and public helper data $\vec{b}$ and matrix A may be used to regenerate at least a secret $\vec{s}$. In an embodiment, bits of $\vec{e}$ that may be considered unstable or otherwise undesireable for purposes or stable regeneration may be discarded, resulting in associated reduction in length of $\vec{b}$ and A. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Extraction may include extraction of a symmetric key; for instance, remote device 108 and/or secure computing module 112 may extract one or more random numbers based on a PUF 120 output to create a symmetric key as described above. Alternatively or additionally, extraction may include extraction of a private key of a public key cryptographic system.

In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a remote device and/or secure computing module 112 may convert immediate output from PUF 120 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a remote device and/or secure computing module 112 may extract one or more random numbers based on a PUF 120 output to create a symmetric key as described above. Alternatively or additionally, extraction may include extraction of a private key of a public key cryptographic system.

Still referring to FIG. 3, key extraction may include use of a number output by a PUF 120 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF 120; steps along a chosen elliptic curve may then be performed using random number to generate a public key. Initial point on elliptic curve and elliptic curve may be selected using an additional random number, which may be generated using any suitable method; random numbers associated with curves having known vulnerabilities may be discarded, according to mathematical descriptors or other characteristics of such vulnerabilities as stored in memory of or accessible to remote device 108 and/or secure computing module 112. Persons skilled in the art, upon reading the entirety of this disclosure, will be aware of various ways in which a random number may be used to generate a private and public key pair consistently with this disclosure.

Still viewing FIG. 3, key extraction may utilize a numerical output from a PUF 120 or other element of secure computing module 112 to generate an RSA private key or other private or symmetric public key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 120 and/or elements of secure computing module 112 may generate one or more random numbers, for instance by using one or more PUFs as described above; any suitable algorithm may be used for generating a prime from a random number to produce pairs of primes usable as RSA factors or other random numbers, public/private key, symmetric public key or the like. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 3, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. A secure computing module 112 may act as a "first signer" of a digital signature, signing with a private key produced from a secret generator as described above, which may be a group key. In an embodiment secure computing module 112 signs an element of data using the private key. A second signer, which may include a manufacturer device or another device endorsing key and/or secret used for first signing may previously or subsequently sign the element of data and/or a verification datum associated with the secure proof and/or digital signature used for first signing; alternatively or additionally, second signer may use information or signature elements provided by secure computing module 112 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. Similar processes may be performed, such as without limitation Intel EPID. Where a manufacturer or other device signs group public key and/or verification datum, such signature may be provided, distributed to one or more verifying nodes, or the like.

In an embodiment, and with continued reference to FIG. 3, secure proof may include a zero-knowledge proof, which may provide an output demonstrating possession of a secret while revealing none of the secret to a recipient of the output. Zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 3, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be, as a non-limiting example, 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 3, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. In an embodiment, zero-knowledge proof may include PCPs based on interleaved Reed-Solomon codes. Persons skilled in the art, upon reviewing the entirety of this disclosure, will be aware of various forms of zero-knowledge proofs that may be used, singly or in combination, consistently with this disclosure.

Still referring to FIG. 3, secure proof may include be generated using a physically unclonable function and may utilize at least a random number generator (RNG), true random number generator (TRNG) or other source of entropy. For instance, and without limitation, an output of a PUF 120 may be used to generate a private key for a digital signature as described above. Alternatively or additionally, a PUF 120 output may constitute a secret to be used as a basis for a zero-knowledge proof, which may be any zero-knowledge proof as described herein.

Still referring to FIG. 3, secure computing module 112 and/or remote device 108 may generate one or more elements of additional information, which may be referred to herein as "verification data" that user or device may use to evaluate secure proof. For instance, secure computing module 112 and/or remote device 108 may generate a public key; public key may be provided automatically to any querying device. Alternatively or additionally, public key may be provided to a manufacturer of secure computing module 112, permitting manufacturer to act as a certificate authority for secure computing module 112. In an embodiment, public key may be generated using a recoverable key generation mechanism, as is described above for recoverable public/private key pairs via at least a PUF 120. Similarly, secure computing module 112 and/or remote device 108 may generate data necessary to perform verification of a zero-knowledge proof by any verifier as described above. Such a verification datum may be included in authorization token as described in further detail below, permitting remote device 108 to demonstrate its link to the token by providing a corresponding secure proof on demand.

In an embodiment, determining an identity of at least a remote device 108 may include determining identity of a first remote device of at least a remote device 108 using a first identification protocol and determining identity of a second remote device using a second identification protocol, wherein the first identification protocol is distinct from the second identification protocol. As a non-limiting example, at least a remote device 108 of at least a remote device 108 may be identified using a TTP protocol, while a second may be identified using a DAA protocol. As a further example, a at least a remote device 108 may be identified using a first version of a secure computing module 112 incorporated in the first remote device, while a second remote device may be identified using a second version of a secure computing module 112; the first version may, for instance, be a GhostRider implementation while the second is an SGX implementation, or the like. In an embodiment, identification of remote devices 108 using heterogenous methods decreases the likelihood of an exploit successfully compromising all devices, as such an exploit would be required to take advantage of a potentially wide range of different vulnerabilities. Furthermore, in an embodiment first verifying node 104 may perform a time-of-evaluation selection of identification protocols, for instance by selecting from a stored menu of protocols using a random number generator or pseudorandom number generator; this may further decrease the probability of a successful exploit.

Alternatively or additionally, and still referring to FIG. 3, first verifying node 104 receive an identity of remote device 108 by identifying a device fingerprint of remote device; this may be performed as a function of at least a field parameter of at least a communication, which may include all or part of a communication submitted via remote device. At least a field parameter may be any specific value set by remote device, device containing remote device and/or user thereof for any field regulating exchange of data according to protocols for electronic communication. As a non-limiting example, at least a field may include a "settings" parameter such as SETTINGS_HEADER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," 'transaction_id," and the like. Determining the identity of the remote device may include fingerprinting the remote device as a function of at least a machine operation parameter described in the at least a communication. At least a machine operation parameter, as used herein, may include a parameter describing one or more metrics or parameters of performance for a computing device and/or incorporated or attached components; at least a machine operation parameter may include, without limitation, clock speed, monitor refresh rate, hardware or software versions of, for instance, components of remote device, a browser running on remote device, or the like, or any other parameters of machine control or action available in at least a communication. In an embodiment, a plurality of such values may be assembled to identify processor and distinguish it from other devices. For instance, user profile may contain information that may be compared to transaction history and/or device fingerprint; where such information is inconsistent in a manner suggesting some prevarication or degree of obfuscation, this may result in a lower confidence level than if such data is consistent.

With continued reference to FIG. 3, at step 310 first verifying node 104 authenticates remote device 108. In an embodiment, authentication may include evaluating a secure proof generated by the remote device 108 and identifying the remote device 108 as a function of the secure proof. Evaluating a secure proof may include receiving a verification datum corresponding to secure proof and evaluating the secure proof as a function of the verification datum. Verification datum, as used herein, is any datum that may be used to aid in evaluation of secure proof; for instance, where secure proof includes a digital signature generated using a private key of a public key cryptographic system, verification datum may include a corresponding public key. Similarly, where secure proof includes a zero-knowledge proof, verification datum may include verification data useable to verify zero-knowledge proof. Secure proof and/or verification data may be included in authorization request; for instance, and without limitation, remote device 108 may transmit an authorization request including secure proof as part of a secure sockets layer communication or the like. Alternatively or additionally secure proof may function as or be a portion of a digital signature for a digitally signed assertion as described in further detail above.

In an embodiment, and still referring to FIG. 3, authentication may include verification of a manufacturer or other device signature of a verification datum linked to device identifier, including without limitation a device-specific public key and/or verification datum or a group public key and/or verification datum as described above. For instance, verifying node 104 may evaluate a manufacturer signature of a group public key purportedly connected to remote device 108 and evaluate a secure proof generated by remote device 108 using related secret and/or private key; authentication may include solely determining that each such signature and/or secure proof is valid. Alternatively or additionally, authentication may include checking whether manufacturer, a verifying node, and/or other devices have recorded information in connection with device identifier, such as compromises or other negative behavior associated with the identifier as described above, or any other measure of history associated with identifier in any transactions and/or temporally sequential listing. Any other form of authentication as described herein may alternatively or additionally be included in authentication. In an embodiment, where a group identifier such as a group public key is compromised or otherwise cannot be authenticated, verifying node 104 and/or nodes may request a device-specific identifier as described above, and authenticate based on that. In place of a manufacturer, a verifying node or set of verifying nodes may have signed device identifier, as an "endorsement" of trustworthiness of remote device 108 and/or group of devices associated with group identifier.

With continued reference to FIG. 3, first verifying node 104 may verify identity and/or authenticate remote device 108 by querying an instance of a distributed authentication listing containing authentication information using at least a datum of the authorization token. Authentication listing may be reflected in verified device registry 132 and may be frequently updated to reflect changes in device, and/or node authentication status. Verified device registry 132 may be also updated to remove a device and/or node after expiration of a time varying authorization token as described in further detail below. In an embodiment, first verifying node 104 may query verified device registry 132 using at least a datum of the authorization token by comparing a hash generated of an authorization token, such as an authorization token issued to remote device 108, and comparing it to a hash located on verified device registry 132. Hashes that are analogous may indicate authentication can move forward. Entries in verified device registry 132 may include authentication determinations; as used herein, an authentication determination is an entry in verified device registry 132 establishing identity, group identity, authentication, authorization, status as a verifying node 132 and/or confidence level of a device or group of devices in system 100. For instance, an authentication determination may include a verification datum associated with a verifying node, potentially with one or more secure proofs indicating conference on verifying node of its status by one or more other devices such as other verifying nodes, such that a secure proof in storage authentication token generated by verified node may be determined to have been issued by a verified node. An authentication determination may include a verification datum associated with at least a remote device 108 and/or a group including at least a remote device 108, which may in turn be signed by one or more verifying nodes with an entry one or more authorization and/or authentication rights granted to an associated device; as a result, storage authentication token may consist only of a secure proof issued by at least a remote device 108, which may be verified and associated with authorization and/or authentication levels granted to at least a remote device 108 by reference to authentication determination. Similarly, an authentication determination may include a time-varying property such as a time limit and/or time-varying authentication lease, which may apply either to a period of validity of authentication determination itself or of a storage authorization token associated therewith as described above.

In an embodiment, and still viewing FIG. 3, querying instance of verified device registry 132 may be performed according to one or more protocols for efficient querying. For instance, where verified device registry 132 is temporally sequential, one or more entries therein, which may be referred to herein as "authentication determinations," may include time-varying properties, time limits, and/or time-limited authentication leases, as described above; first verifying node 104 may search only entries in instance of verified device registry 132 in which entries are recent enough not to have expired. As a non-limiting example, a maximal length of a time-limited authentication lease associated with any entry may be recorded or known in system 100 and/or verified device registry 132, so that entries recorded longer than that maximum period prior to a current time, as determined for instance by a singular or distributed timestamp authority of the like, may be ignored by first verifying node 104 and/or other devices in system 100. As a further example, where time-limited leases are granted in synchronized lease epochs, first verifying node 104 or other device querying verified device registry 132 may search only as far back as a term of a relevant lease epoch. Alternatively or additionally, one or more indices, hash tables, or other data structures or elements of data structures may be provided with verified device registry 132 to permit querying to be performed efficiently.

With continued reference to FIG. 3, first verifying node 104 may retrieve an authentication determination from verified device registry 132. Authentication determination may include a secure proof as described above. Authentication determination that includes a secure proof may include a verification datum associated with the secure proof. Verification datum may aid in the evaluation of secure proof as described above. Authentication determination may include a signature generated by a verifying node. In an embodiment, signature may include a digital signature signifying authentication determination has been verified by verifying node. Authentication determination may also include an entry of verifying node located on verified device registry. Verified device registry may be included in a temporally sequential listing and updated to reflect changes in device status. Verified device registry may include a list containing current information regarding verifying nodes. In an embodiment, verifying nodes can move on and off verified device registry. For example, a verifying node may be added to verified device registry when verifying node has been authenticated, for instance by one or more additional verifying nodes. However, verifying node may only be authenticated for a certain period of time, after which verifying node may be removed from verifying node registry, and/or entry on verified device registry 132 may cease to be valid according to protocols described above for time-varying properties and/or time-limited authentication leases. Over time, verifying node may be reauthenticated and as such, may be added back onto verified device registry 132. Verifying nodes that have authentication privileges revoked and/or have authentication privileges expired after a certain quantifiable period of time, may be listed on a revocation list. Retrieving an authentication datum may include authenticating one or more distributed storage nodes of at least a distributed storage node by checking the revocation list. Revocation list may be part of verified device registry 132 or revocation list may be a separate listing. Revocation list may be included in a temporally sequential listing and may be updated frequently to reflect changes in authentication status. Authentication listing may also include a calculated confidence level of at least a distributed node.

With continued reference to FIG. 3, in an embodiment, authenticating remote device 108 may include determining a geographic location of remote device 108. This may be accomplished in various ways. For instance, and without limitation, determining the geographic location of remote device 108 may include identifying an internet protocol address of remote device 108 and determining the geographic location as a function of internet protocol address; this may be accomplished according to IP address geolocation. Alternatively or additionally, determination of geographic location may include determination of proximity to a second verifying node 128, where second verifying node 128 may have a known, recorded, or verified geographic location, and/or of proximity to first verifying node 104.

Still referring to FIG. 3, proximity may be determined according one or more measures of distance or time second verifying node 128 and remote device 108, and/or remote device 108 and first verifying node 104. For instance, and without limitation, where one device is connected to another via a network, proximity may be evaluated by measuring distances between the two devices in a graph representing the network; proximity may include, for instance a number of steps through the graph from the once device to another. Steps may also be weighted according to, e.g., estimates of physical distance or length of wire between devices connected by steps, as measured using network latency analysis and/or other processes for instance as described below. Proximity may include geographical location of any devices as described above may alternatively or additionally be determined using navigational facilities, such as the global positioning system (GPS) or other protocols used to determine the location of a device. Distance between devices may be computed using this information. Proximity may include temporal proximity; this may be computed using network latency analysis, time for response to a "ping" signal, or the like. Alternatively or additionally, past response times and/or past times involving communications in the past may be recorded in memory and/or in a temporally sequential listing. In an embodiment, geographic location of remote device 108 may be determined as near to or within a certain radius of a device having a known geographic location.

With continued reference to FIG. 3, first verifying node 104 may calculate at least a heuristic of trust as a function of the at least an authorization request from the remote device. At least a heuristic of trust may include one or more processes for determining a degree to which remote device 108 may be treated as trustworthy, based on partial or limited information; for instance, at least a heuristic of trust may be calculated or computed with regard to remote device 108 not identifiable using a secure computing module 112, by using geographic location, device fingerprint information, and/or other data as described in further detail herein, to identify determine trust in a device that is not as definitely identifiable as it would be using a secure computing module 112. At least heuristic of trust may output a confidence level as defined above as its output, and/or take at a confidence level as an input. Heuristics to infer trustworthiness of nodes and/or remote devices 108 may be used in a positive or negative sense—that is, a positive heuristic connotes more trustworthiness, while a negative heuristic can be used to flag outliers that may be considered more likely to behave dishonestly.

Still referring to FIG. 3, calculation of at least a heuristic of trust may include determining a duration of past interaction and calculating the at least a heuristic as a function of the duration of past interaction; for instance, if remote device 108 has a longer history of interactions with first verifying node 104 and/or a network or platform at issue, verifying 104 may assign a higher confidence level to remote device 108. Calculating the at least a heuristic of trust may include determining a most recent time of past interaction and calculating the at least a heuristic of trust as a function of the most recent time of past interaction; for instance, where remote device 108 has interacted with first verifying node 104 and/or a network or platform in question more recently a higher confidence level may be associated with remote device 108 as described in more detail directly below. Calculating at least a heuristic of trust may include determining a degree of obscurity of the remote device 108; for instance, where remote device 108 is sandboxed (preventing evaluation of machine-control parameters), or connecting through a proxy, TOR or other location/IP address-obscuring protocol or facility, the resulting inability to discover information concerning remote device 108 may itself be used to assign a lower confidence level to at least a remote device 108.

With continued reference to FIG. 3, authenticating may include calculating a confidence level in remote device 108. Calculating a confidence level may include calculating a confidence level as a function of the at least a confidence level in authenticity and/or identity of remote device 108, where identity may be determined according to any process for determination thereof described in this disclosure. Confidence level in identity may be computed, for instance, using one or more statistical measures of reliability of the identification method used; for instance, a user may enter an instruction on a processor providing statistics indicating success rates of various identification methods. Statistics may be collected based, as a non-limiting example, on discoveries of vulnerabilities in particular identification protocols and/or particular instances of secure computation module. A user of system 100 may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise assigning a confidence level as a function of the confidence level in the identity. A device included in system 100 may also determine confidence level in identity as a function of, for instance, one or more algorithms collecting statistics concerning degree of accuracy in past iterations of a particular process for identifying at least a distributed storage node.

With continued reference to FIG. 3, at least a confidence level may include a single confidence level assigned to a remote device 108, a plurality of confidence levels assigned to a plurality of remote devices 108, an aggregate confidence level of a plurality of remote devices 108, or any other single or plural confidence level as described herein. Assigning a confidence level may include evaluating at least a digitally signed assertion signed by a first verifying node 104 of the at least a remote device 108 and assigning a confidence level to the remote device 108 as a function of the evaluation of the at least a digitally signed assertion. At least a digitally signed assertion may be identified as signed by at least a first verifying node 104 using any identification process or protocol as described above. In an embodiment, at least a digitally signed assertion may be incorporated in a temporally sequential listing of digitally signed assertions. For instance, where temporally sequential listing is a blockchain or similar data structure, each assertion may be included in a blockchain. At least a second digitally signed assertion may include a plurality of digitally signed assertions. For instance, at least a first distributed storage node may record a series of digitally signed assertions in temporally sequential listing; each transaction of the series of transactions may be authenticated by any process suitable for authenticating temporally sequential listing, including any process described herein for authentication of temporally sequential listing. As a further non-limiting example, at least a first verifying node 104 may enter an initial digitally signed assertion attesting to one or more elements of identification and/or authentication, including without limitation attestation of manufacturing date of at least a remote device 108 and/or secure computing module 112, identities, serial numbers, versions, or make of hardware components of at least a remote device 108 and/or secure computing module 112, or the like. Transactions performed by at least a remote device 108 may be scored according to authenticity; for instance, trusted status may be conferred on remote device 108 only if a certain number of authenticated transactions have been performed by at least a remote device 108, a certain amount of value has been conveyed in authenticated transactions by at least a remote device 108, a certain proportion (which may be 100%) of transactions performed by at least a remote device 108 have been successfully authenticated, or any other suitable benchmarking and/or scoring process or combination thereof. At least a digitally signed assertion may include assertions that were recorded in rejected instances of a temporally sequential listing 204, such as rejected forks; in an embodiment, confidence level may be reduced as a function of a number of rejected forks including assertions signed by at least a data storage node, for instance.

Still referring to FIG. 3, calculating the at least a confidence level may include receiving a consensus evaluation of the at least a confidence level from a network of devices and/or verifying nodes in system 100. For instance, all devices currently connected to network may determine a confidence level concerning a particular remote device 108. This determination may be performed, for instance, by authenticating one or more current or past instances of a temporally sequential listing 204 and/or one or more sub-listings 208 thereof. Determination may include identification of one or more rejected instances of temporally sequential listing 204. Each device of a plurality of devices may provide a confidence level for the remote device 108 to be evaluated. A device connected to network, including without limitation first verifying node 104, may calculate an aggregate confidence level based on confidence levels submitted by plurality of verifying nodes 104; aggregation may be performed according to any method for aggregation of confidence levels described above. In an embodiment, aggregation may be weighted according to a previously determined confidence level of each first verifying node 104 of distributed verifying nodes 128 performing consensus determination of confidence level of remote device 108 to be evaluated. This may include, e.g., ignoring confidence level submissions from evaluators having confidence levels below a certain threshold; alternatively or additionally, a processor may request confidence level determinations by a plurality of evaluators previously determined to have a confidence level above a certain threshold level. Each first verifying node 104 and/or other processor participating in consensus determination of confidence level may perform any action described herein for determining a confidence level, or any combination of such actions. Alternatively or additionally, and as further described below, each verifying node of plurality of verifying nodes may perform one or more steps of an embodiment of method 300, or other methods as described herein, to generate an authorization token, as a function of authentication that each verifying node has performed.

With continued reference to FIG. 3, assigning the at least a confidence level may include evaluating a digitally signed assertion assigning a recorded confidence level to a remote device 108, and assigning the confidence level as a function of the recorded confidence level. Digitally signed assertion may be any digitally signed assertion as described herein. Digitally signed assertion may be produced by a second verifying node 128, and/or other participant in system 100. Digitally signed assertion may be included in any temporally sequential listing as described herein, including without limitation verified device registry 132; temporally sequential listing may include a temporally sequential listing relating identifiers of remote device 108 and/or other devices incorporated in system 100 to confidence levels, where identifiers may be any data usable as identifiers as described herein. Assignment of confidence level may be performed as a function of identifier; that is, identifier may be linked to an identity of remote device 108, which may be used for assignment of confidence level as described in this disclosure. A device making a determination, including without limitation first verifying node 104, may receive an instance of temporally sequential listing; receiving may include receiving an entire copy of the instance, receiving a sub-listing, receiving a link to temporally sequential listing, or a portion thereof, stored remotely, receiving digitally signed assertion along with an indication of temporally sequential listing containing digitally signed assertion, or the like. As a non-limiting example, one or more processors, a consensus process, and/or a network of devices having a confidence level in excess of a threshold, may have previously evaluated a confidence level in a certain remote device 108 and/or other device; in an embodiment, such a confidence level may itself be recorded in an assertion listed in temporally sequential listing 204. A plurality of such assertions, corresponding to a plurality of devices, including assertions corresponding to remote device 108, may be listed; as such, a processor may determine confidence level in one or more remote devices 108 solely by retrieving confidence levels so recorded. Alternatively or additionally, a processor may combine such confidence levels with confidence level determinations made by other means. Combination may be performed, e.g., by retrieving such confidence levels from temporally sequential listing 204 for at least a remote device 108 and calculating a confidence level for at least a second remote device 108 by any other process described above. As a further example, a processor may retrieve a confidence level recorded in temporally sequential listing 204 for a given device, determine a confidence level for the same device, and then aggregate the two confidence levels according to any process as described above for aggregation of confidence levels.

Still referring to FIG. 3, confidence level may be weighted or modified according to one or more additional factors. For instance, confidence level may be weighted according to how recently at least a remote device 108 and/or other device signed a digitally signed assertion in an authenticated instance of temporally sequential listing 204, where a more recently authenticated assertion may result in a higher confidence level or higher weight assigned to the confidence level, and a less recently authenticated assertion may result in a lower confidence level or a lower weight assigned to that confidence level. As another example, a device that has recently "sold off" a large amount of value and/or has an assertion in a sub-listing 208 currently awaiting authentication may have its confidence level decreased. As a further example, an evaluator with little or no history, or an anonymous evaluator, may be assigned some minimal or "neutral" confidence level indicating treatment as a "consensus" evaluator rather than a "trusted" evaluator. An evaluator associated with a previous fraudulent transaction may be assigned a confidence level of zero or may be excluded from evaluation processes.

With continued reference to FIG. 3, calculating the at least a confidence level may include performing a trusted time evaluation of at least an action performed by remote device 108. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that a secure computing module 112 is an authentic secure computing module 112 that has the property of attested time. Generating a secure timestamp may be used to weed out spoofers or "man in the middle attacks."

Still referring to FIG. 3, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 112. Additional data may include one or more additional data, including sensor data or a hash of data, that are received or generated by a processor. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other verifying nodes, may evaluate confidence levels in at least remote device 108 or other party generating secure timestamp and/or perform threshold cryptography with a plurality of such parties, each of which may have performed an embodiment of method to produce a secure timestamp. In an embodiment, data storage nodes or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

Continuing to refer to FIG. 3, in an embodiment, system 100 may utilize a distributed trusted time protocol. In an embodiment, distributed trusted time may be established using at least a verifying node, a monotonic counter and current local timestamp of at least a secure computing module 112, and a device signature. In such a scheme, a secure computing module 112 makes a sampling of local machine reference timebase into at least a secure enclave, and increments a monotonic counter also residing in the secure enclave. Secure computing module 112 signs the message containing local machine reference time and monotonic counter, and broadcasts this signed message. This process occurs at regular time intervals where the time interval T is less than the allowable clock skew of local machine reference timebase utilized in verifying node, such that one may readily determine whether an unexpected lapse forward or backward in distributed timebase is result of clock skew or a malicious actor attempting to falsify timestamp. Distributed time may further utilize two or more such verifying nodes broadcasting signed local machine reference timebases, their result being averaged or otherwise corrected. Verifying nodes selected to perform distributed time broadcast may be pre-defined, or may selected via random oracle by any means described herein with reference to selection of verifiers for authorization and token generation. Averaging or otherwise correcting outputs from multiple broadcasting local machine reference timebases may be done by all nodes, or may be performed by a selected at least a random leader, again selected via random oracle by any means described herein. In the latter case, broadcast from the averaging at least a random leader further incorporates monotonic counter and signature as described above. Rotation of selection of remote device 108s may occur periodically. For additional guarantees, signature may include an authorization token as described below.

With continued reference to FIG. 3, at least a confidence level calculated in remote device 108 may be compared to a threshold level. A threshold level may comprise a minimum acceptable confidence level of remote device 108. A threshold level may indicate trustworthiness of remote device 108. In an embodiment, a confidence level of remote device 108 failing to meet threshold levels may be considered untrustworthy and as such may not be utilized. Confidence levels of remote device 108 that meet and/or exceed threshold levels may be considered trustworthy and as such may become verified. Weak points in verifying protocols may be performed by highly trusted nodes greatly exceeding threshold levels, such as first verifying node 104 and/or second verifying node 128. Remote device 108 failing to meet threshold levels may be flagged or marked as suspicious.

With continued reference to FIG. 3, at step 315 first verifying node 104 generates an authorization token. An authorization token, as used herein, is an element of data usable to determine that at least a remote device is or may be authorized to perform an action within system 100, such as an action requested by remote device. Authorization token may be specific to at least a remote device 108. Authorization token may include or refer to a group identifier such as a group public key, whereby authorization token may not be tied to a unique identifier of just at least a remote device 108. Authorization token may be a time limited token as described in more detail below, so that at least a remote device 108 may need to be re-authenticated before expiration to continue performing actions as permitted by authorization token. As described further below, token may include a signed timestamp and counter value, a passphrase required to decrypt messages on the network, or some combination. Authorization token may include a secure proof as described above in reference to FIG. 3, generated and signed by the at least a remote device 108. Authorization token may include a secure proof signed by verifying node 132. In an embodiment, secure proof generated by and signed by at least a remote device 108 and/or verifying node 132 may be associated with a verification datum. Verification datum as used herein, is any datum that may be used to aid in evaluation of secure proof, as described above in more detail in reference to FIG. 3. Authorization token may include information contained in a listing located on verified device registry 132.

With continued reference to FIG. 3, authorization token may include a time-varying token, which may have a time limit after which time-varying token is no longer valid. Time limit may be calculated from an initial time, which may be a datum linked to a particular timestamp or other value representing a fixed moment in time, associated with time-varying token; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a secure timestamp is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Still referring to FIG. 3, a temporal attribute and/or token containing the temporal attribute may be available for other devices and/or verifying nodes to view. In an embodiment, the temporal attribute and/or token containing the temporal attribute may be linked to the authorization token. In an embodiment the authorization token may include a public key of a cryptographic system. In such an instance, other devices on the network may be able to access the public key and view both the duration of the authorization token and how recently the authorization token was generated. In an embodiment, the temporal attribute and/or token containing the temporal attribute may be linked to first verifying node 104 and may be stored on a temporally sequential listing. Other devices and/or verifying nodes may have access to the temporally sequential listing and may be able to view the authorization token of first verifying node 104. Authorization token may further include or be associated with a confidence level that at least a verifying node 132 has associated with at least a remote device 108 as described above. In an alternative embodiment where the specifics of time remaining on a authorization token may be undesirable to expose, e.g. when such information may aid malicious actors in preferentially targeting a particular first verifying node 104, authorization token, in the open or via shared cryptographic key specific to authenticate devices or a subset of authenticated devices, may simply indicate whether or not the authorization token is valid at time of inquiry. It may be desirable to limit the number of requests for validity of a authorization token, e.g. to avoid exposing information that may aid malicious actors in preferentially targeting a particular first verifying node 104.

Figure 4:
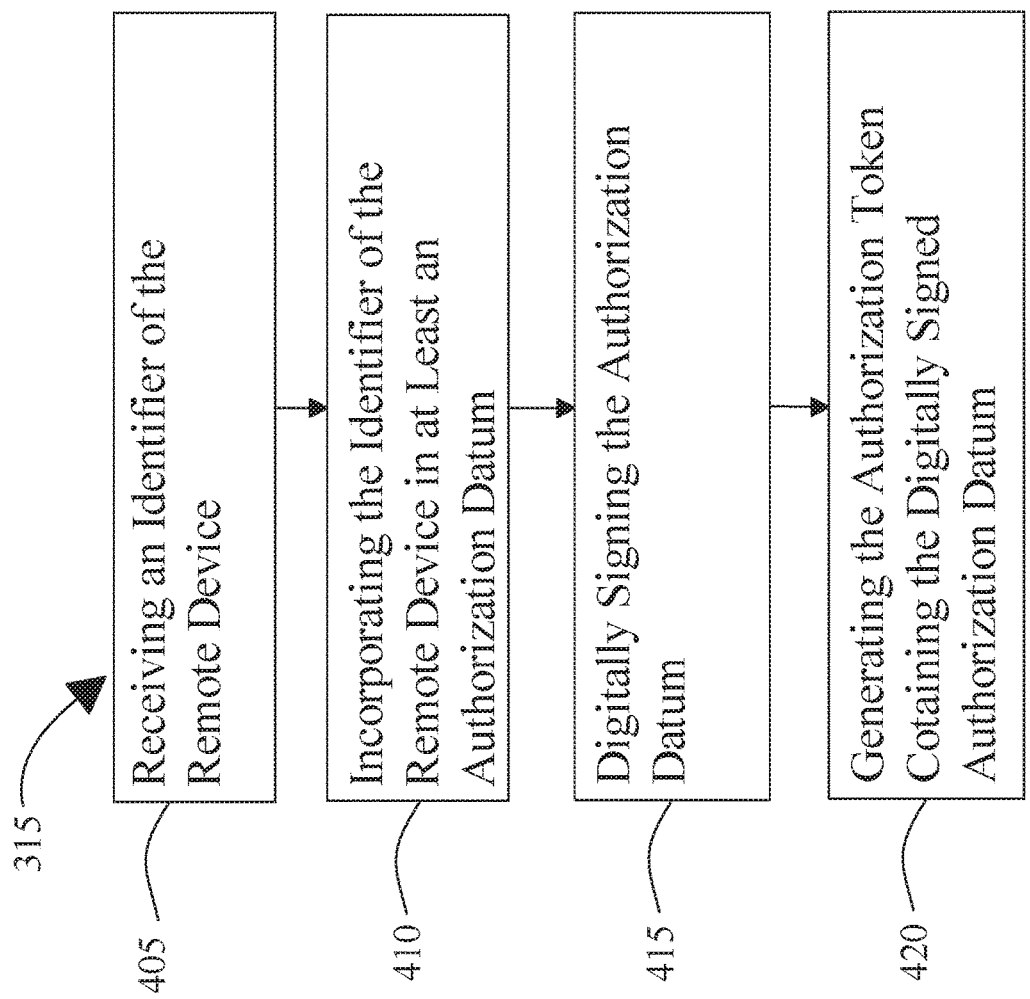
FIG. 4 is a flow diagram illustrating an exemplary embodiment of a method of generating an authorization token for verifying a remote device joining a network using trusted hardware.

Referring now to FIG. 4, exemplary embodiments of steps for generation 315 of an authorization token by first verifying node 104 are illustrated. At step 405, verifying node may receive an identifier of remote device 108, as described above. At step 410, identifier of remote device 108 may be incorporated in at least an authorization datum; as noted above, identifier may be specific to remote device 108 or may be a group identifier as described above, including without limitation a group public key; in other words, authorization token may not be tied to a unique identifier of remote device 108. Authorization token may include, for instance with and/or as part of identifier, a secure proof generated by the remote device; secure proof may be generated using any process and/or protocol for generation of a secure proof as described in this disclosure.

Still referring to FIG. 4, verifying node may confirm authenticity of a manufacturer/endorsing signature and/or signature made using identifier, and then provides authorization token following confirmation; token may be a time limited token as described in further detail below, such that the remote device 108 must be re-authenticated before expiration continue performing actions as permitted by authorization token. As described further below, token may include a signed timestamp and counter value, a passphrase required to decrypt messages on the network, or some combination. As used herein, an authorization datum is a datum granting one or more rights that may be requested in an authorization request as described above. For instance, and without limitation, an authorization datum may include a digital certificate as described above; digital certificate may, for instance and without limitation, associate an identity of a user or entity operating remote device 108 with an identifier of remote device, confer upon remote device access rights to one or more resources incorporated in or connected to system 100, associate remote device 108 with a given confidence level, grant a transfer of assets, data, and/or access rights from one device to another, or the like. An authorization datum may confer a right to access one or more resources incorporated in or connected to system 100.

An authorization datum may associate an identity of a user or entity operating remote device 108 with an identifier of remote device. An authorization datum may confer upon remote device access rights to one or more resources incorporated in or connected to system 100. An authorization datum may associate remote device 108 with a given confidence level. An authorization datum may grant a transfer of assets, data, and/or access rights from one device to another, or the like. In an embodiment, an authorization datum may classify remote device 108 as a verifying node, such as without limitation at least a second verifying node 128, authorized to perform actions described herein as performed by first verifying node 104, which may be performed in combination with other verifying nodes as described in further detail below. In an embodiment, the authorization datum may certify remote device 108 to participate on the network as a non-verifier. In such an instance, remote device 108 may participate on the network but remote device 108 may not be a first verifying node 104. In an embodiment, the authorization datum may certify remote device 108 to access system 100 and/or a network implemented by the system 100. In such an instance, remote device 108 may access the network but may not verify and/or participate in certain services on the network.

Still referring to FIG. 4, in some cases it may be desirable to maintain anonymity (either anonymity of the remote device with respect to the verifier, and/or anonymity of the remote device in subsequent use of the authorization token on the network), while still issuing at least an authorization datum. In some embodiments a resulting authorization token may include a temporal attribute. To facilitate anonymity, in an exemplary embodiment of authorization token in which it is desired to maintain anonymity of the remote device while using at least a authorization token, the at least a authorization token may contain at least one of the following attributes: a secure timestamp indicating the time that the token was created, a monotonic counter value or other datum unique to the authorization token for this particular remote device 108, and/or a session key conferring access to the network at the time of token creation. Additionally or separately, at least a authorization token may include an expiration period, e.g. a fixed time limit relative to the verifier's local time the token was created or issued, and may include at least a trust level based upon the properties of the remote device 108 attested in the authorization process, as described herein. It may be desirous to separately or additionally provide at least a session key enabling remote device 108 to encrypt and/or decrypt messages to at least a second remote device 108, or at least a group of remote devices 108, based on properties of commonality between remote devices. In non-limiting example, session key may be a symmetric key conveyed via secure channel from the at least a verifier, and/or an asymmetric key, multisignature, threshold signature or key system resulting from multi-signature or threshold signature as described above, or other key system or datum associated with at least a verifier during at least a time epoch. The foregoing may be signed in whole or in part, or any logical combination, by the at least a verifier. In an embodiment, the at least a verifier may share via secure channel a copy of or subset of the verified device registry 132, and additional parameters including at least a secret, in order for the remote device 108 to evaluate authorization token credentials of another device as being contained or represented in the verified device registry 132.

With continued reference to FIG. 4, authorization token may include a time-limited authentication lease serving to speed up transactions by authenticating a node, such as requesting node 104, at least a remote device 108, or other device participating in system 100, during the pendency of the lease and resolving inefficiencies of peer-to-peer transactions and ad hoc authentication, and to prevent spoofing; time-limited lease may be implemented using, or may include, a time-varying token. A time-limited authentication may speed up transactions by implementing a one-time authentication for the duration of the lease as opposed to having each interaction with the node needing to be authenticated. In an embodiment, authenticating a node and/or other device using time-limited authentication lease involves checking that the lease is valid, thereby avoiding having to perform a direct anonymous attestation and/or generate secure proof; checking that the lease is valid may include determination that a time limit associated with time-limited token has not expired, as well as evaluating any secure proof included in time-limited authentication lease. A time-limited authentication lease as used herein may include a time limited token indicating that a particular node has been authenticated and verified by trusted nodes on the network. A time-limited token may serve to inform other nodes on the network that a particular node need not be re-authenticated for the duration of the validity of the lease (i.e. until a time limit of a time-limited token included or associated with the lease has expired). This may help in reducing authenticating and verification time and thus reduce overall transaction time by reducing the number of calculations that need to occur. Use of time-limited authentication lease may protect against spoofing by authenticating nodes for a set duration in time. By authenticating nodes for a set duration in time this may reduce chances that a malicious node may try to join the network and corrupt nodes by spoofing, for example. This may be of particular importance in smaller networks in which nodes regularly leave and enter other networks or reenter networks. A length of a time-limited authentication lease may depend on network parameters and may also depend on the physical and software security of a given node type. In an embodiment, a time-limited authentication lease may be implemented using a network lease key that is rotated every lease epoch (where a lease epoch may be a synchronized period in which a given network lease key is valid across system 100, by reference to an accepted set of temporal data, such as secure timestamps, timestamp hash chains, and/or single or distributed timestamp authorities as described in further detail below), thereby ensuring that software compromises to the lease key cryptography do not persist beyond a given epoch. A time-limited authentication lease may include a base name in a modification of a direct anonymous authentication scheme. In an embodiment, the lease key may be authenticated by known verifiers, which may be nodes that function to authenticate lease keys. To mitigate vulnerabilities arising from compromised nodes being able to corrupt a network, verifying nodes may be held to specific standards. Standards may include that verifiers may be selected at random, and verifiers may produce threshold signatures. For example, multiple randomly chosen verifiers may authenticate a new node within a specific window of time, verifier selection may be subjected to random audits, and mechanisms may be in place to audit a chain of authentication. For example, an audit of what nodes authenticated a given node may be performed to ensure that malicious attacks such as spoofing have not occurred.

In an alternative or additional embodiment, at least an authorization token may be created via blind signatures. In a representative embodiment of blind signature-based authorization token, the at least a remote device 108 wishing to receive at least an authorization token may generate multiple different lease certificates. At least a remote device 108 may encrypt all or the majority of lease certificates and communicate them to at least a verifier. At least a verifier may select one or more certificates at random. At least a remote device 108 may further provide decryption keys to all but one or more certificates. At least a verifier may evaluate at least one of the certificates to which the at least a verifier has been given decryption keys. If at least a verifier deems that the certificates, based on information obtainable, are authentic, then the verifier blindly signs the one or more certificates for which the verifier does not have a key, and communicates this to remote device 108 for use as at least a authorization certificate, as described herein.

With continued reference to FIG. 4, at step 415 first verifying node 104 may digitally sign authorization datum. Signing authorization datum may include any form of digital signature described above, including generating a secure proof as described above in FIGS. 3 and 4. The secure proof may be implemented according to a direct anonymous attestation protocol, and may include a digital signature, zero-knowledge proof, and/or a PUF as described above in FIGS. 3 and 4.

At step 420, first verifying node 104 may generate an authorization token containing the digitally signed authorization datum. Authorization token may include a temporal attribute, that may set time limits of validity of remote device 108 within a particular group of services, or for all network functions. In an embodiment, authorization token may include a time-varying token, which may have a time limit after which time-varying token is no longer valid. Time limit may be calculated from an initial time, which may be a datum linked to a particular timestamp or other value representing a fixed moment in time, associated with time-varying token; initial time may be a time of creation, a time of verification, or other significant time relating to validity of time-varying token. Initial time may include, without limitation, a timestamp, which may include a secure timestamp, and/or a datum linked to a secure timestamp such as a cryptographic hash of the secure timestamp or the like. Initial time may be recorded in or with token. As a non-limiting example, time-varying token may include initial time, along with an identification of at least a remote device 108, where identification may be membership in a group but otherwise anonymous, a unique persistent identification, or a unique but anonymous identification, and/or identification of a specific device, which may include any form of identification as described above, including without limitation a secure proof; alternatively or additionally, where time-varying token is recorded in a temporally sequentially listing, such as without limitation a verified device registry 132, initial time may be recorded as a time of insertion of a record or lot of records including time-varying token, a time of creation or authentication of a sublisting containing time-varying token, or the like. Time-varying token may include one or more attestations from other devices in system 100; as a non-limiting example, time-varying token may include secure proofs, such as without limitation digital signatures from one or more devices. One or more devices may include, without limitation, one or more verifying nodes 128; as an illustrative example, one or more verifying nodes 128 linked to time-varying tokens that have not yet expired may create one or more attestations included in a time-varying token linked to a device to be classified as a verified device using one or more attestations. In other words, a community of currently verified devices may be able to authenticate a device that is not currently verified. In an embodiment, a community of currently verified devices may evaluate the digitally signed authorization datum of first verifying node 104, identify remote device 108 and the timestamp, and then apply a time limit to remote device 108. In such an example, the time limit may be found in the authorization token or may just be known by, for instance, network, group or subgroup specific parameters, application specific parameters, parameters associated with the confidence level or trust level of a device, and any combination thereof.

With continued reference to FIG. 4, a temporal attribute such as a time limit may be based on the confidence level of remote device 108. Confidence level may be calculated and assigned to remote device 108 as previously discussed above in reference to FIG. 3. Confidence level, as an indication of trustworthiness and/or robustness to compromise by malicious actors of remote device 108, may impact a temporal attribute of the authorization token. For example, remote device 108, having a high confidence level, thereby indicating a very trustworthy remote device 108, may be granted a time-varying token with a longer time limit than a remote device 108 that has a very low confidence level, and is not a trustworthy remote device 108.

With continued reference to FIG. 4, the temporal attribute and/or token containing the temporal attribute may be available for other devices and/or verifying nodes 104 to view. In an embodiment, the temporal attribute and/or token containing the temporal attribute may be linked to the authorization token. In an embodiment the authorization token may include a public key of a cryptographic system. In such an instance, other devices on the network may be able to access the public key and view both the duration of the authorization token and how recently the authorization token was generated. In an embodiment, the temporal attribute and/or token containing the temporal attribute may be linked to remote device 108 identifier and may be stored on a temporally sequential listing. Other devices and/or verifying nodes 104 may have access to the temporally sequential listing and may be able to view the authorization token of remote device 108. Authorization token may further include or be associated with a confidence level that first verifying device 104 has associated with remote device 108 as described above. In an alternative embodiment where the specifics of time remaining on an authorization token may be undesirable to expose, e.g. when such information may aid malicious actors in preferentially targeting a particular remote device 108, authorization token, in the open or via shared cryptographic key specific to authenticate devices or a subset of authenticated devices, may simply indicate whether or not the token is valid at time of inquiry. It may be desirable to limit the number of requests for validity of a token, e.g. to avoid exposing information that may aid malicious actors in preferentially targeting a particular remote device 108.

Referring again to FIG. 3, authorization token generated by first verifying node 104 may be shared with the at least a device. Sharing may include providing the at least a device with the authorization token to prove that a remote device 108 has been verified and/or granted some type of privilege and/or access as to the network. In an embodiment, sharing may include making the authorization token public so that it is visible to other devices, or a subset of devices (e.g. only those with a shared cryptographic key) to be easily ascertained. In an embodiment, sharing may include inserting the authorization token may be recorded in a temporally sequential listing, such as without limitation verified device registry 132. In another embodiment, generating the authorization token may include generation by the at least a verifying node 104 the at least a key unique to remote device 108 and the at least a time-varying parameter as described above, and communication of the at least a unique private key or keypair via secure channel to at least a remote device 108. Verifying node 104 may additionally append the at least a unique device specific, session specific public key, its hash, or other datum whose association with the at least a unique key signature may be determined given knowledge of particular parameters, those parameters may include at least a secret, to a verified device registry 132. The effective outcome of this series of steps may be that the remote device 108 has been authenticated as being a valid member of one of more group keys, e.g. indicating that the device is authentically manufactured by a given manufacturer. Subsequently the verifier node 104 generates a unique keypair specific to remote device 108 and shares this over secure channel to remote device 108, along with e.g. a symmetric key or other secret specific to an authorization session duration. Verifier may also append corresponding key (e.g. the session-specific, device specific public key from previous keypair generation) or some other datum unique to the device and session but otherwise unlinkable to the remote device 108, to the verified device registry 132.

Still referring to FIG. 3, in an embodiment, one or more steps of method 300 may be performed by a plurality of verifying nodes including first verifying node 104 and at least a second verifying node 128. Each of plurality of verifying nodes may, for instance, sign authorization token. In an embodiment, generation of authorization token in step 315 above may include receiving, from at least a second verifying node, an authorization token containing authorization datum and identifier of remote device, and digitally signing the authorization token. Verifying nodes may follow an order of signing, which may be established using another random oracle, or in an order established by bitmask magnitude, device identifier magnitude, or any other ordering of data associated with verifying nodes. Alternatively or additionally, each verifying node may post a distinct authorization token to system 100, which may be maintained in verified device register 132 or any other suitable data structure including without limitation a temporally sequential listing as described above in reference to FIG. 2 In an embodiment, a combination of signatures of verifying nodes may be used as input to a key derivation function, either directly or obfuscated using a one way function prior to key derivation function.

Continuing to refer to FIG. 3, any device participating in system 100 may determine whether remote device 108 is authorized to perform a given action or access a given resource or datum by evaluating each authorization token; for instance, where N of K verifying nodes are required to have authorized a right requested in authorization request, each device may verify that N verifying nodes have generated authorization token or tokens as described above. Each device may further determine whether each verifying node has validly implemented random oracle procedure or other selection procedure for selecting verifying nodes to participate in method 300; contribution of a verifying node that did not correctly follow selection procedure be ignored for purposes of determining whether remote device 108 is authorized as required.

Still viewing FIG. 3, each device in system 100 determining whether remote device 108 is authorized to perform an action may use a threshold cryptography protocol, as described above. In other words, a plurality of verifying nodes enacting methods as described above may be treated as a group of certificate authorities acting to authenticate in coordination, with the requirement that a threshold number of the group of certificate authorities, and/or a threshold proportion of the group of certificate authorities, agree (e.g. "threshold cryptography") for authorization to be valid; threshold may include a number of verifying nodes. Threshold may include an aggregate confidence level threshold. For instance, where each verifying node has included a confidence level in an authorization token, confidence levels may be aggregated according to any process or process steps described above to produce an aggregate confidence level, which must exceed a threshold, or aggregate confidence level of agreeing verifying nodes may be required to represent a threshold proportion of aggregate confidence level of all verifying nodes in group. Additional embodiments may include group signature schemes that issue certificates on a membership public key generated by a secure computing module as described in further detail above; in such scenarios, authentication may include proof by the secure computing module that the secure computing module possesses a secret key to a public key/certificate pair.

In an embodiment, system 100 may act to collect manufacturer group public keys, and issue an authorization token to a particular device, conferring a trust level, which you may be publicly exposed to other group members. Authorization token may be released as a "session" public key with an expiration as described above, and signed by the verifier; token may include a session key linked to a private key sent in an encrypted for to remote device 108, permitting the remote device 108 so it can sign and/or decrypt using session key. In embodiments, authorization token may include elements such as or analogous to EPID basename, session decryption keys, secret passphrases, decryption keys that may enable access to a directory, and the like. Authorization token may alternatively or additionally include a reference to device identifier, such as group public key, device-specific public key, or the like, which may be used similarly to session key.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
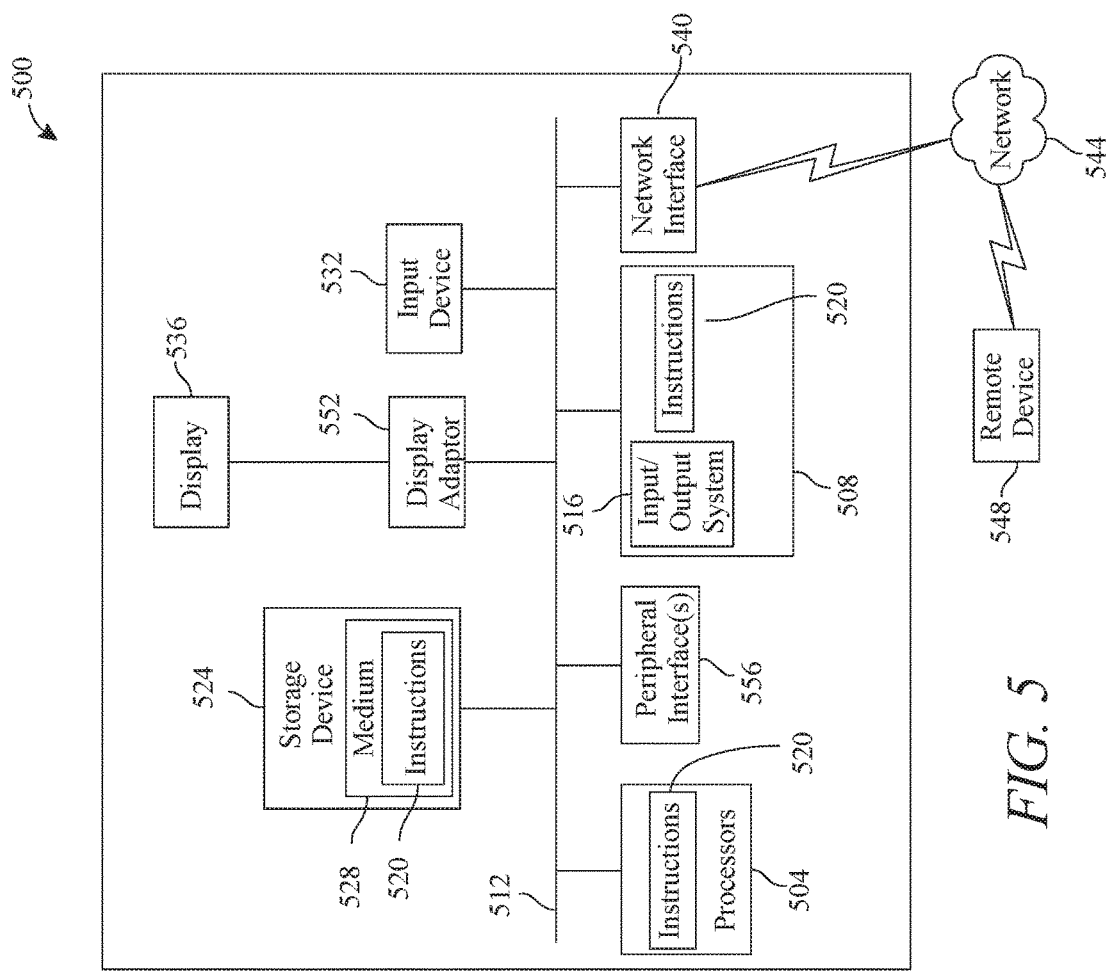
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of implementing a distributed certificate authority using trusted hardware, the method comprising:
    receiving, at a first verifying node, an authorization request from a remote device, wherein receiving the authorization request further comprises receiving an identifier of the remote device;
    authenticating, by the first verifying node, the remote device; and
    generating, by the first verifying node, an authorization token, wherein generating the authorization token further comprises:
        associating the identifier of the remote device with at least an authorization datum;
        associating a temporal attribute with the authorization token;
        digitally signing the authorization datum with a physically unclonable function; and
        storing the authorization datum in a temporally sequential listing.

2. The method of claim 1, wherein receiving further comprises generating a random oracle output assigning the authorization request to the first verifying node.

3. The method of claim 2, wherein generating includes:
    receiving a cryptographic hash generated from the authorization request by the first verifying node; and
    generating the random oracle output as a function of the cryptographic hash.

4. The method of claim 3, wherein generating further comprises:
    receiving a device-specific bit-mask;
    comparing the cryptographic hash to the device specific bit-mask; and
    generating the random oracle output as a function of the comparison.

5. The method of claim 1, wherein authenticating further comprises calculating, by the first verifying node, at least a heuristic of trust as a function of the at least an authorization request from the remote device.

6. The method of claim 5, wherein calculating the at least a heuristic of trust further comprises:
    determining a most recent time of past interaction; and
    calculating the at least a heuristic of trust as a function of the most recent time of past interaction.

7. The method of claim 1, wherein authenticating further comprises calculating a confidence level in the remote device.

8. The method of claim 1, wherein the authentication datum certifies the remote device as a second verifying node.

9. The method of claim 1, wherein the authentication datum grants an access right to the remote device.

10. The method of claim 1, wherein the temporal attribute further comprises a secure timestamp.

11. A system for implementing a distributed certificate authority using trusted hardware, the system comprising:
    a first verifying node communicatively coupled to a plurality of remote devices, the verifying node designed and configured to receive an authorization request from a remote device, wherein receiving the authorization request further comprises receiving an identifier of the remote device, authenticate the remote device, and generate an authorization token, wherein generating the authorization token further comprises associating the identifier of the remote device with at least an authorization datum, associating the identifier of the remote device with at least a temporal attribute, digitally signing the authorization datum with a physically unclonable function, generating the authorization token containing the digitally signed authorization datum, and storing the authorization datum in a temporally sequential listing.

12. The system of claim 11, wherein the first verifying node is further configured to receive the authorization request by generating a random oracle output assigning the authorization request to the first verifying node.

13. The system of claim 12, wherein generating includes:
    receiving a cryptographic hash generated from the authorization request by the first verifying node; and
    generating the random oracle output as a function of the cryptographic hash.

14. The system of claim 13, wherein generating further comprises:
    receiving a device-specific bit-mask;
    comparing the cryptographic hash to the device specific bit-mask; and
    generating the random oracle output as a function of the comparison.

15. The system of claim 11, wherein the first verifying node is further configured to authenticate the remote device by calculating, at least a heuristic of trust as a function of the at least an authorization request from the remote device.

16. The method of claim 15, wherein calculating the at least a heuristic of trust further comprises:
    determining a most recent time of past interaction; and
    calculating the at least a heuristic of trust as a function of the most recent time of past interaction.

17. The method of claim 11, wherein the first verifying node is further configured to authenticate the remote device by calculating a confidence level in the remote device.

18. The method of claim 11, wherein the authentication datum certifies the remote device as a second verifying node.

19. The method of claim 11, wherein the authentication datum grants an access right to the remote device.

20. The method of claim 11, wherein the temporal attribute further comprises a secure timestamp.

* * * * *